(12) United States Patent
Bhattacharya et al.

(10) Patent No.: US 8,751,294 B2
(45) Date of Patent: Jun. 10, 2014

(54) PROCESSING VALUE-ASCERTAINABLE ITEMS

(75) Inventors: Ashmit Bhattacharya, Pleasanton, CA (US); Bruce Bower, Menlo Park, CA (US); Gary Briggs, Los Gatos, CA (US); Marc Gendron, Clovis, CA (US); Steve Grove, San Jose, CA (US); Tina Henson, Fresno, CA (US); Parker Thomas, Alameda, CA (US)

(73) Assignee: e2interactive, Inc., Atlanta, GA (US)

( * ) Notice: Subject to any disclaimer, the term of this patent is extended or adjusted under 35 U.S.C. 154(b) by 0 days.

(21) Appl. No.: 13/467,997

(22) Filed: May 9, 2012

(65) Prior Publication Data

US 2012/0221405 A1     Aug. 30, 2012

Related U.S. Application Data

(62) Division of application No. 12/903,987, filed on Oct. 13, 2010.

(60) Provisional application No. 61/266,910, filed on Dec. 4, 2009.

(51) Int. Cl.
*G06Q 30/00*   (2012.01)

(52) U.S. Cl.
USPC ............... 705/14.1; 705/14.11; 705/14.15; 705/14.19; 705/14.23; 705/14.38

(58) Field of Classification Search
USPC ............ 705/14.1, 14.11, 14.15, 14.19, 14.23, 705/14.38
See application file for complete search history.

(56) References Cited

U.S. PATENT DOCUMENTS

| 3,553,440 A | 1/1971 | Dale |
| 3,958,103 A | 5/1976 | Oka et al. |
| 4,068,213 A | 1/1978 | Nakamura et al. |

(Continued)

FOREIGN PATENT DOCUMENTS

| EP | 1164777 A | 12/2001 |
| EP | 1361775 A | 11/2003 |

(Continued)

OTHER PUBLICATIONS

Roguski, R., "Online companies will buy or trade gift cards you don't want." Cleveland.com ("Roguski") dated Jan. 3, 2008 (4 pages).

(Continued)

*Primary Examiner* — Oluseye Iwarere
*Assistant Examiner* — Peter L Ludwig
(74) *Attorney, Agent, or Firm* — Landmark Intellectual Property Law, PC

(57) ABSTRACT

Techniques are provided for allowing a merchant to process third party closed-loop instruments (such as gift cards) as if the closed-loop instruments were open-loop instruments. A customer provides card data of a third party gift card to a merchant, e.g., online or in a merchant store, for the purchase of one or more items provided by the merchant. The merchant sends the gift card data to an intermediary that deducts at least a portion of the balance of the gift card. The intermediary sends an offer for the gift card to the customer. If the customer accepts the offer, then the merchant applies the offer towards the total purchase price of the one or more items.

12 Claims, 10 Drawing Sheets

(56) References Cited

U.S. PATENT DOCUMENTS

| | | |
|---|---|---|
| 4,482,802 A | 11/1984 | Aizawa et al. |
| 4,734,858 A | 3/1988 | Schlafly |
| 4,747,049 A | 5/1988 | Richardson et al. |
| 4,755,940 A | 7/1988 | Brachtl et al. |
| 4,767,917 A | 8/1988 | Ushikubo |
| 4,795,892 A | 1/1989 | Gilmore et al. |
| 4,877,947 A | 10/1989 | Mori |
| 4,900,904 A | 2/1990 | Wright et al. |
| 4,908,521 A | 3/1990 | Boggan et al. |
| 4,943,707 A | 7/1990 | Boggan |
| 5,117,355 A | 5/1992 | McCarthy |
| 5,202,826 A | 4/1993 | McCarthy |
| 5,255,182 A | 10/1993 | Adams |
| 5,274,845 A | 12/1993 | Wang |
| 5,350,906 A | 9/1994 | Brody et al. |
| 5,384,449 A | 1/1995 | Peirce |
| 5,465,206 A | 11/1995 | Hilt et al. |
| 5,465,288 A | 11/1995 | Falvey et al. |
| 5,477,038 A | 12/1995 | Levine et al. |
| 5,500,513 A | 3/1996 | Langhans et al. |
| 5,502,765 A | 3/1996 | Ishiguro et al. |
| 5,511,114 A | 4/1996 | Stimson et al. |
| 5,524,073 A | 6/1996 | Stambler |
| 5,577,109 A | 11/1996 | Stimson et al. |
| 5,578,808 A | 11/1996 | Taylor |
| 5,621,201 A | 4/1997 | Langhans et al. |
| 5,621,787 A | 4/1997 | McKoy et al. |
| 5,644,721 A | 7/1997 | Chung et al. |
| 5,657,389 A | 8/1997 | Houvener |
| 5,673,309 A | 9/1997 | Woynoski et al. |
| 5,679,938 A | 10/1997 | Templeton et al. |
| 5,679,940 A | 10/1997 | Templeton et al. |
| 5,684,291 A | 11/1997 | Taskett |
| 5,696,908 A | 12/1997 | Muehlberger et al. |
| 5,696,909 A | 12/1997 | Wallner |
| 5,705,798 A | 1/1998 | Tarbox |
| 5,721,768 A | 2/1998 | Stimson et al. |
| 5,721,781 A | 2/1998 | Deo et al. |
| 5,732,136 A | 3/1998 | Murphree et al. |
| 5,754,655 A | 5/1998 | Hughes et al. |
| 5,760,381 A | 6/1998 | Stich et al. |
| 5,777,305 A | 7/1998 | Smith et al. |
| 5,777,565 A | 7/1998 | Hayashi et al. |
| 5,806,045 A | 9/1998 | Biorge et al. |
| 5,815,561 A | 9/1998 | Nguyen et al. |
| 5,828,740 A | 10/1998 | Khuc et al. |
| 5,836,455 A | 11/1998 | Connor et al. |
| 5,844,972 A | 12/1998 | Jagadish et al. |
| 5,870,724 A | 2/1999 | Lawlor et al. |
| 5,873,072 A | 2/1999 | Kight et al. |
| 5,889,863 A | 3/1999 | Weber |
| 5,903,633 A | 5/1999 | Lorsch |
| 5,903,830 A | 5/1999 | Joao et al. |
| 5,903,874 A | 5/1999 | Leonard et al. |
| 5,903,878 A | 5/1999 | Talati et al. |
| 5,909,492 A | 6/1999 | Payne et al. |
| 5,918,909 A | 7/1999 | Fiala et al. |
| 5,930,363 A | 7/1999 | Stanford et al. |
| 5,945,653 A | 8/1999 | Walker et al. |
| 5,955,951 A | 9/1999 | Wischerop et al. |
| 5,956,695 A | 9/1999 | Carrithers et al. |
| 5,956,700 A | 9/1999 | Landry |
| 5,987,132 A | 11/1999 | Rowney et al. |
| 5,988,509 A | 11/1999 | Taskett |
| 5,991,413 A | 11/1999 | Arditti et al. |
| 5,991,748 A | 11/1999 | Taskett |
| 5,999,624 A | 12/1999 | Hopkins |
| 6,000,608 A | 12/1999 | Dorf |
| 6,003,014 A | 12/1999 | Lee et al. |
| 6,010,249 A | 1/2000 | Melchior et al. |
| 6,012,049 A | 1/2000 | Kawan |
| 6,016,480 A | 1/2000 | Houvener et al. |
| 6,018,570 A | 1/2000 | Matison |
| 6,029,151 A | 2/2000 | Nikander |
| 6,032,133 A | 2/2000 | Hilt et al. |
| 6,032,135 A | 2/2000 | Molano et al. |
| 6,032,859 A | 3/2000 | Muehlberger et al. |
| 6,038,549 A | 3/2000 | Davis et al. |
| 6,047,270 A | 4/2000 | Joao et al. |
| 6,056,289 A | 5/2000 | Clapper, Jr. |
| 6,058,300 A | 5/2000 | Hanson |
| 6,058,382 A | 5/2000 | Kasai et al. |
| 6,062,472 A | 5/2000 | Cheung |
| 6,072,870 A | 6/2000 | Nguyen et al. |
| 6,073,842 A | 6/2000 | Yoshinaga |
| 6,088,682 A | 7/2000 | Burke |
| 6,092,053 A | 7/2000 | Boesch et al. |
| 6,094,643 A | 7/2000 | Anderson et al. |
| 6,098,053 A | 8/2000 | Slater |
| 6,105,008 A | 8/2000 | Davis et al. |
| 6,108,642 A | 8/2000 | Findley |
| 6,119,105 A | 9/2000 | Williams |
| 6,119,106 A | 9/2000 | Mersky et al. |
| 6,119,946 A | 9/2000 | Teicher |
| 6,129,276 A | 10/2000 | Jelen et al. |
| 6,138,106 A | 10/2000 | Walker et al. |
| 6,142,369 A | 11/2000 | Jonstromer |
| 6,158,657 A | 12/2000 | Hall, III et al. |
| 6,167,387 A | 12/2000 | Lee-Wai-Yin |
| 6,169,975 B1 | 1/2001 | White et al. |
| 6,169,976 B1 | 1/2001 | Colosso |
| 6,173,272 B1 | 1/2001 | Thomas et al. |
| 6,175,823 B1 | 1/2001 | Van Dusen |
| 6,182,894 B1 | 2/2001 | Hackett et al. |
| 6,185,545 B1 | 2/2001 | Resnick et al. |
| 6,188,752 B1 | 2/2001 | Lesley |
| 6,189,787 B1 | 2/2001 | Dorf |
| 6,190,256 B1 | 2/2001 | Walker et al. |
| 6,202,933 B1 | 3/2001 | Poore et al. |
| 6,208,851 B1 | 3/2001 | Hanson |
| RE37,122 E | 4/2001 | Levine et al. |
| 6,215,999 B1 | 4/2001 | Dorenbosch |
| 6,226,364 B1 | 5/2001 | O'Neil |
| 6,226,624 B1 | 5/2001 | Watson et al. |
| 6,237,023 B1 | 5/2001 | Yoshimoto |
| 6,240,397 B1 | 5/2001 | Sachs |
| 6,256,690 B1 | 7/2001 | Carper |
| 6,282,566 B1 | 8/2001 | Lee, Jr. et al. |
| 6,285,749 B1 | 9/2001 | Manto |
| 6,289,010 B1 | 9/2001 | Voit et al. |
| 6,295,522 B1 | 9/2001 | Boesch |
| 6,298,336 B1 | 10/2001 | Davis et al. |
| 6,302,326 B1 | 10/2001 | Symonds et al. |
| 6,304,915 B1 | 10/2001 | Nguyen et al. |
| 6,308,887 B1 | 10/2001 | Korman et al. |
| 6,311,165 B1 | 10/2001 | Coutts et al. |
| 6,311,170 B1 | 10/2001 | Embrey |
| 6,314,171 B1 | 11/2001 | Dowens |
| 6,315,195 B1 | 11/2001 | Ramachandran |
| 6,315,206 B1 | 11/2001 | Hansen et al. |
| 6,324,525 B1 | 11/2001 | Kramer et al. |
| 6,328,341 B2 | 12/2001 | Klure |
| 6,330,544 B1 | 12/2001 | Walker et al. |
| 6,330,976 B1 | 12/2001 | Dymetman et al. |
| 6,332,135 B1 | 12/2001 | Conklin et al. |
| 6,333,976 B2 | 12/2001 | Lesley |
| 6,363,362 B1 | 3/2002 | Burfield et al. |
| 6,375,073 B1 | 4/2002 | Aebi et al. |
| 6,381,582 B1 | 4/2002 | Walker et al. |
| 6,381,631 B1 | 4/2002 | Van Hoff |
| 6,386,457 B1 | 5/2002 | Sorie |
| 6,397,196 B1 | 5/2002 | Kravetz et al. |
| 6,405,182 B1 | 6/2002 | Cuervo |
| 6,422,462 B1 | 7/2002 | Cohen |
| 6,424,706 B1 | 7/2002 | Katz et al. |
| 6,434,238 B1 | 8/2002 | Chaum et al. |
| 6,439,613 B2 | 8/2002 | Klure |
| 6,442,532 B1 | 8/2002 | Kawan |
| 6,445,780 B1 | 9/2002 | Rosset et al. |
| 6,454,165 B1 | 9/2002 | Dawson |
| 6,467,684 B2 | 10/2002 | Fite et al. |
| 6,473,500 B1 | 10/2002 | Risafi et al. |
| 6,494,367 B1 | 12/2002 | Zacharias |
| 6,502,745 B1 | 1/2003 | Stimson et al. |

(56) References Cited

U.S. PATENT DOCUMENTS

| | | |
|---|---|---|
| 6,507,644 B1 | 1/2003 | Henderson et al. |
| 6,525,953 B1 | 2/2003 | Johnson |
| 6,529,593 B2 | 3/2003 | Nelson |
| 6,529,880 B1 | 3/2003 | McKeen et al. |
| 6,549,770 B1 | 4/2003 | Marran |
| 6,575,361 B1 | 6/2003 | Graves et al. |
| 6,581,827 B2 | 6/2003 | Welton |
| 6,582,827 B1 | 6/2003 | Im |
| 6,588,658 B1 | 7/2003 | Blank |
| 6,591,098 B1 | 7/2003 | Shieh et al. |
| 6,592,035 B2 | 7/2003 | Mandile |
| 6,594,640 B1 | 7/2003 | Postrel |
| 6,609,113 B1 | 8/2003 | O'Leary et al. |
| 6,615,189 B1 | 9/2003 | Phillips et al. |
| 6,615,190 B1 | 9/2003 | Slater |
| 6,625,438 B2 | 9/2003 | Hanson |
| 6,643,503 B1 | 11/2003 | Phillips |
| 6,648,222 B2 | 11/2003 | McDonald et al. |
| 6,651,885 B1 | 11/2003 | Arias |
| 6,659,259 B2 | 12/2003 | Knox et al. |
| 6,675,153 B1 | 1/2004 | Cook et al. |
| 6,684,269 B2 | 1/2004 | Wagner |
| 6,714,918 B2 | 3/2004 | Hillmer et al. |
| 6,736,314 B2 | 5/2004 | Cooper et al. |
| 6,745,022 B2 | 6/2004 | Knox |
| 6,754,636 B1 | 6/2004 | Walker et al. |
| 6,786,655 B2 | 9/2004 | Cook et al. |
| 6,805,289 B2 | 10/2004 | Noriega et al. |
| 6,814,282 B2 | 11/2004 | Seifert et al. |
| 6,820,802 B2 | 11/2004 | Biggar et al. |
| 6,827,260 B2 | 12/2004 | Stoutenburg et al. |
| 6,836,765 B1 | 12/2004 | Sussman |
| 6,836,962 B2 | 1/2005 | Khandros et al. |
| 6,837,426 B2 | 1/2005 | Tidball et al. |
| 6,848,613 B2 | 2/2005 | Nielsen et al. |
| 6,882,984 B1 | 4/2005 | Boyle et al. |
| 6,932,268 B1 | 8/2005 | McCoy et al. |
| 6,948,065 B2 | 9/2005 | Grawrock |
| 6,961,412 B2 | 11/2005 | Ruckart et al. |
| 6,991,157 B2 | 1/2006 | Bishop et al. |
| 7,024,174 B2 | 4/2006 | Nagy et al. |
| 7,039,654 B1 | 5/2006 | Eder |
| 7,054,842 B2 | 5/2006 | James et al. |
| 7,069,248 B2 | 6/2006 | Huber |
| 7,072,864 B2 | 7/2006 | Brake, Jr. et al. |
| 7,073,196 B1 | 7/2006 | Dowd et al. |
| 7,083,084 B2 | 8/2006 | Graves et al. |
| 7,085,931 B1 | 8/2006 | Smith et al. |
| 7,093,761 B2 | 8/2006 | Smith et al. |
| 7,103,577 B2 | 9/2006 | Blair et al. |
| 7,107,249 B2 | 9/2006 | Dively et al. |
| 7,130,817 B2 | 10/2006 | Karas et al. |
| 7,131,578 B2 | 11/2006 | Paschini et al. |
| 7,131,582 B2 | 11/2006 | Welton |
| 7,171,199 B1 | 1/2007 | Rahman |
| 7,182,252 B1 | 2/2007 | Cooper et al. |
| 7,194,438 B2 | 3/2007 | Sovio et al. |
| 7,209,889 B1 | 4/2007 | Whitfield |
| 7,209,890 B1 | 4/2007 | Peon et al. |
| 7,222,090 B2 | 5/2007 | Oddo |
| 7,229,006 B2 | 6/2007 | Babbi et al. |
| 7,229,014 B1 | 6/2007 | Snyder |
| 7,243,082 B1 * | 7/2007 | Forlai .................. 705/37 |
| 7,243,839 B2 | 7/2007 | Beck et al. |
| 7,249,054 B2 | 7/2007 | Keil |
| 7,249,097 B2 | 7/2007 | Hutchison et al. |
| 7,269,256 B2 | 9/2007 | Rosen |
| 7,292,998 B2 | 11/2007 | Graves et al. |
| 7,325,725 B2 | 2/2008 | Foss, Jr. |
| 7,328,190 B2 | 2/2008 | Smith et al. |
| 7,333,955 B2 | 2/2008 | Graves et al. |
| 7,363,265 B2 | 4/2008 | Horgan |
| 7,370,012 B2 | 5/2008 | Karns et al. |
| 7,376,431 B2 | 5/2008 | Niedermeyer |
| 7,376,583 B1 | 5/2008 | Rolf |
| 7,398,248 B2 | 7/2008 | Phillips et al. |
| 7,437,328 B2 | 10/2008 | Graves et al. |
| 7,494,048 B2 | 2/2009 | Gusler et al. |
| 7,536,349 B1 | 5/2009 | Mik et al. |
| 7,566,000 B2 | 7/2009 | Agostino et al. |
| 7,650,308 B2 | 1/2010 | Nguyen et al. |
| 7,673,327 B1 | 3/2010 | Pollis et al. |
| 7,690,580 B2 | 4/2010 | Shoemaker |
| 7,774,209 B2 | 8/2010 | James et al. |
| 7,866,548 B2 | 1/2011 | Reed et al. |
| 7,941,373 B1 | 5/2011 | Chang et al. |
| 7,953,654 B2 | 5/2011 | Abifaker |
| 7,958,049 B2 | 6/2011 | Jamison et al. |
| 8,046,268 B2 | 10/2011 | Hunt |
| 8,060,413 B2 | 11/2011 | Castell et al. |
| 8,082,210 B2 | 12/2011 | Hansen et al. |
| 8,152,060 B2 | 4/2012 | Wolfe et al. |
| 8,152,061 B2 | 4/2012 | Wolfe et al. |
| 8,195,568 B2 | 6/2012 | Singhal |
| 8,371,502 B1 * | 2/2013 | Galit et al. .................. 235/380 |
| 8,500,007 B2 * | 8/2013 | Wolfe et al. .................. 235/380 |
| 8,631,999 B2 * | 1/2014 | Wolfe et al. .................. 235/379 |
| 2001/0000808 A1 | 5/2001 | Lesley |
| 2001/0001321 A1 | 5/2001 | Resnick et al. |
| 2001/0001856 A1 | 5/2001 | Gould et al. |
| 2001/0005840 A1 | 6/2001 | Verkama |
| 2001/0023415 A1 | 9/2001 | Keil |
| 2001/0032878 A1 | 10/2001 | Tsiounis et al. |
| 2001/0033752 A1 | 10/2001 | Cook et al. |
| 2001/0034707 A1 | 10/2001 | Sakaguchi |
| 2001/0042784 A1 | 11/2001 | Fite et al. |
| 2001/0044293 A1 | 11/2001 | Morgan |
| 2002/0004889 A1 | 1/2002 | Honma et al. |
| 2002/0016749 A1 | 2/2002 | Borecki et al. |
| 2002/0022966 A1 | 2/2002 | Horgan |
| 2002/0023217 A1 | 2/2002 | Wheeler et al. |
| 2002/0025797 A1 | 2/2002 | Joao et al. |
| 2002/0035539 A1 | 3/2002 | O'Connell |
| 2002/0069139 A1 | 6/2002 | Bernstein et al. |
| 2002/0070953 A1 | 6/2002 | Barg et al. |
| 2002/0077076 A1 | 6/2002 | Suryanarayana et al. |
| 2002/0077993 A1 | 6/2002 | Immonen et al. |
| 2002/0088855 A1 | 7/2002 | Hodes |
| 2002/0091573 A1 | 7/2002 | Hodes |
| 2002/0100803 A1 | 8/2002 | Sehr |
| 2002/0101966 A1 | 8/2002 | Nelson |
| 2002/0115424 A1 | 8/2002 | Bagoren et al. |
| 2002/0119767 A1 | 8/2002 | Fieldhouse et al. |
| 2002/0133457 A1 | 9/2002 | Gerlach et al. |
| 2002/0133467 A1 | 9/2002 | Hobson et al. |
| 2002/0138351 A1 | 9/2002 | Houvener et al. |
| 2002/0138450 A1 | 9/2002 | Kremer |
| 2002/0152123 A1 | 10/2002 | Giordano et al. |
| 2002/0152179 A1 | 10/2002 | Racov |
| 2002/0161631 A1 | 10/2002 | Banerjee et al. |
| 2002/0169623 A1 | 11/2002 | Call et al. |
| 2002/0169713 A1 | 11/2002 | Chang et al. |
| 2002/0175207 A1 | 11/2002 | Kashef et al. |
| 2002/0190123 A1 | 12/2002 | Anvekar et al. |
| 2003/0001005 A1 | 1/2003 | Risafi et al. |
| 2003/0001055 A1 | 1/2003 | Harary et al. |
| 2003/0004737 A1 | 1/2003 | Conquest et al. |
| 2003/0004889 A1 | 1/2003 | Fiala et al. |
| 2003/0004891 A1 | 1/2003 | Van Rensburg et al. |
| 2003/0009382 A1 | 1/2003 | D'Arbeloff et al. |
| 2003/0014266 A1 | 1/2003 | Brown et al. |
| 2003/0014360 A1 | 1/2003 | Arditti et al. |
| 2003/0019770 A1 | 1/2003 | Hodes |
| 2003/0023552 A1 | 1/2003 | Kight et al. |
| 2003/0028481 A1 | 2/2003 | Flitcroft et al. |
| 2003/0033246 A1 | 2/2003 | Slater |
| 2003/0038175 A1 | 2/2003 | Welton |
| 2003/0055782 A1 | 3/2003 | Slater |
| 2003/0061157 A1 | 3/2003 | Hirka et al. |
| 2003/0061162 A1 | 3/2003 | Matthews |
| 2003/0069846 A1 | 4/2003 | Marcon |
| 2003/0070080 A1 | 4/2003 | Rosen |
| 2003/0078835 A1 | 4/2003 | Pluchinske |
| 2003/0088462 A1 | 5/2003 | Carrithers et al. |

(56) References Cited

U.S. PATENT DOCUMENTS

| | | |
|---|---|---|
| 2003/0092435 A1 | 5/2003 | Boivin |
| 2003/0105672 A1 | 6/2003 | Epstein et al. |
| 2003/0135462 A1 | 7/2003 | Brake et al. |
| 2003/0144909 A1 | 7/2003 | Flaherty et al. |
| 2003/0144935 A1 | 7/2003 | Sobek |
| 2003/0163389 A1 | 8/2003 | Merten et al. |
| 2003/0174823 A1 | 9/2003 | Justice et al. |
| 2003/0187781 A1 | 10/2003 | Goodman et al. |
| 2003/0200179 A1 | 10/2003 | Kwan |
| 2003/0200184 A1 | 10/2003 | Dominguez et al. |
| 2003/0204457 A1 | 10/2003 | Arias |
| 2003/0205616 A1 | 11/2003 | Graves et al. |
| 2003/0212796 A1 | 11/2003 | Willard |
| 2003/0220884 A1 | 11/2003 | Choi et al. |
| 2003/0222135 A1 | 12/2003 | Stoutenburg et al. |
| 2003/0226042 A1 | 12/2003 | Fukushima |
| 2003/0233317 A1 | 12/2003 | Judd |
| 2003/0236704 A1 | 12/2003 | Antonucci |
| 2004/0007618 A1 | 1/2004 | Oram et al. |
| 2004/0009760 A1 | 1/2004 | Laybourn et al. |
| 2004/0019568 A1 | 1/2004 | Moenickheim et al. |
| 2004/0024697 A1 | 2/2004 | Landa et al. |
| 2004/0039639 A1 | 2/2004 | Walker et al. |
| 2004/0046035 A1 | 3/2004 | Davila et al. |
| 2004/0049427 A1 | 3/2004 | Tami et al. |
| 2004/0054587 A1 | 3/2004 | Dev et al. |
| 2004/0064412 A1 | 4/2004 | Phillips et al. |
| 2004/0068448 A1 | 4/2004 | Kim |
| 2004/0078332 A1 | 4/2004 | Ferguson et al. |
| 2004/0107170 A1 | 6/2004 | Labrou et al. |
| 2004/0114766 A1 | 6/2004 | Hileman et al. |
| 2004/0118914 A1 | 6/2004 | Smith et al. |
| 2004/0128395 A1 | 7/2004 | Miyazaki |
| 2004/0133511 A1 | 7/2004 | Smith et al. |
| 2004/0153402 A1 | 8/2004 | Smith et al. |
| 2004/0159700 A1 | 8/2004 | Khan et al. |
| 2004/0164145 A1 | 8/2004 | Licciardello et al. |
| 2004/0167821 A1 | 8/2004 | Baumgartner |
| 2004/0172339 A1 | 9/2004 | Snelgrove et al. |
| 2004/0181453 A1 | 9/2004 | Ray et al. |
| 2004/0182922 A1 | 9/2004 | Talarico |
| 2004/0188516 A1 | 9/2004 | De Myttennaere |
| 2004/0195316 A1 | 10/2004 | Graves et al. |
| 2004/0199431 A1 | 10/2004 | Ganesan et al. |
| 2004/0201449 A1 | 10/2004 | Denison et al. |
| 2004/0205023 A1 | 10/2004 | Hafer et al. |
| 2004/0205138 A1 | 10/2004 | Friedman et al. |
| 2004/0206814 A1 | 10/2004 | Kawai et al. |
| 2004/0210449 A1 | 10/2004 | Breck et al. |
| 2004/0210476 A1 | 10/2004 | Blair et al. |
| 2004/0210509 A1 | 10/2004 | Eder |
| 2004/0210519 A1 | 10/2004 | Oppenlander et al. |
| 2004/0215560 A1 | 10/2004 | Amalraj et al. |
| 2004/0215564 A1 | 10/2004 | Lawlor et al. |
| 2004/0215573 A1 | 10/2004 | Teutenberg et al. |
| 2004/0218741 A1 | 11/2004 | Welton |
| 2004/0232225 A1 | 11/2004 | Bishop et al. |
| 2004/0249766 A1 | 12/2004 | Ganesan et al. |
| 2004/0260602 A1 | 12/2004 | Nakaminami et al. |
| 2004/0260646 A1 | 12/2004 | Berardi et al. |
| 2004/0267663 A1 | 12/2004 | Karns et al. |
| 2005/0001027 A1 | 1/2005 | Bahar |
| 2005/0027655 A1 | 2/2005 | Sharma et al. |
| 2005/0033645 A1 | 2/2005 | Duphily |
| 2005/0038714 A1 | 2/2005 | Bonet et al. |
| 2005/0051619 A1 | 3/2005 | Graves et al. |
| 2005/0061872 A1 | 3/2005 | Paschini et al. |
| 2005/0071268 A1 | 3/2005 | Riddett |
| 2005/0075958 A1 | 4/2005 | Gonzalez |
| 2005/0079863 A1 | 4/2005 | Macaluso |
| 2005/0086171 A1 | 4/2005 | Abe et al. |
| 2005/0092828 A1 | 5/2005 | Phillips et al. |
| 2005/0092829 A1 | 5/2005 | Phillips et al. |
| 2005/0103839 A1 | 5/2005 | Hewel |
| 2005/0107068 A1 | 5/2005 | Smith et al. |
| 2005/0108096 A1 | 5/2005 | Burger et al. |
| 2005/0125300 A1 | 6/2005 | McGill et al. |
| 2005/0125348 A1 | 6/2005 | Fulton et al. |
| 2005/0127169 A1 | 6/2005 | Foss |
| 2005/0143051 A1 | 6/2005 | Park |
| 2005/0149387 A1 | 7/2005 | O'Shea et al. |
| 2005/0167481 A1 | 8/2005 | Hansen et al. |
| 2005/0171902 A1 | 8/2005 | Nguyen |
| 2005/0182678 A1 | 8/2005 | Walker et al. |
| 2005/0182720 A1 | 8/2005 | Willard et al. |
| 2005/0184145 A1 | 8/2005 | Law et al. |
| 2005/0199705 A1 | 9/2005 | Beck et al. |
| 2005/0199709 A1 | 9/2005 | Linlor |
| 2005/0203835 A1 | 9/2005 | Nhaissi et al. |
| 2005/0228717 A1 | 10/2005 | Gusler et al. |
| 2005/0234820 A1 | 10/2005 | MacKouse |
| 2005/0240472 A1 | 10/2005 | Postrel |
| 2005/0240526 A1 | 10/2005 | Hill |
| 2005/0242171 A1 | 11/2005 | Smets et al. |
| 2005/0242193 A1 | 11/2005 | Smith et al. |
| 2005/0259589 A1 | 11/2005 | Rozmovits et al. |
| 2005/0261968 A1 | 11/2005 | Randall et al. |
| 2005/0269401 A1 | 12/2005 | Spitzer et al. |
| 2005/0269402 A1 | 12/2005 | Spitzer et al. |
| 2005/0278216 A1 | 12/2005 | Graves |
| 2006/0019634 A1 | 1/2006 | Hawkes |
| 2006/0023856 A1 | 2/2006 | Welton |
| 2006/0026073 A1 | 2/2006 | Kenny et al. |
| 2006/0035632 A1 | 2/2006 | Sorvari et al. |
| 2006/0078100 A1 | 4/2006 | Risafi et al. |
| 2006/0100927 A1 | 5/2006 | Zormati |
| 2006/0113376 A1 | 6/2006 | Reed et al. |
| 2006/0123243 A1 | 6/2006 | Shimosato et al. |
| 2006/0144926 A1 | 7/2006 | Jacobs |
| 2006/0157556 A1 | 7/2006 | Halbur et al. |
| 2006/0161490 A1 | 7/2006 | Chakiris et al. |
| 2006/0163343 A1 | 7/2006 | Changryeol |
| 2006/0167780 A1 | 7/2006 | Friedman |
| 2006/0169766 A1 | 8/2006 | Hoch |
| 2006/0207856 A1 | 9/2006 | Dean et al. |
| 2006/0213968 A1 | 9/2006 | Guest et al. |
| 2006/0213980 A1 | 9/2006 | Geller et al. |
| 2006/0229985 A1 | 10/2006 | Lalwani et al. |
| 2006/0231609 A1 | 10/2006 | Lazarowicz et al. |
| 2006/0231611 A1* | 10/2006 | Chakiris et al. ............... 235/380 |
| 2006/0235754 A1 | 10/2006 | Walker et al. |
| 2006/0249569 A1 | 11/2006 | Jain |
| 2006/0249570 A1 | 11/2006 | Seifert et al. |
| 2006/0255135 A1 | 11/2006 | Smith |
| 2006/0261150 A1 | 11/2006 | Seifert et al. |
| 2006/0271489 A1 | 11/2006 | Flanagan et al. |
| 2006/0277146 A1 | 12/2006 | Dively et al. |
| 2007/0005685 A1 | 1/2007 | Chau et al. |
| 2007/0007333 A1 | 1/2007 | Foss et al. |
| 2007/0045403 A1 | 3/2007 | Slonecker |
| 2007/0063024 A1 | 3/2007 | Guillot |
| 2007/0108269 A1 | 5/2007 | Benco et al. |
| 2007/0118478 A1 | 5/2007 | Graves et al. |
| 2007/0136194 A1 | 6/2007 | Sloan |
| 2007/0167161 A1 | 7/2007 | Cheng et al. |
| 2007/0172063 A1 | 7/2007 | Biggs et al. |
| 2007/0175985 A1 | 8/2007 | Barnes et al. |
| 2007/0179846 A1 | 8/2007 | Jain et al. |
| 2007/0179865 A1 | 8/2007 | Hibler et al. |
| 2007/0185782 A1 | 8/2007 | Shooks et al. |
| 2007/0187494 A1 | 8/2007 | Hanna |
| 2007/0205269 A1 | 9/2007 | Lindon |
| 2007/0214080 A1* | 9/2007 | Babi et al. ............... 705/39 |
| 2007/0272736 A1* | 11/2007 | Brooks et al. ............... 235/379 |
| 2007/0284434 A1 | 12/2007 | Fletcher |
| 2008/0010215 A1 | 1/2008 | Rackley, III et al. |
| 2008/0041938 A1 | 2/2008 | Wise |
| 2008/0109356 A1 | 5/2008 | Sutton et al. |
| 2008/0126145 A1 | 5/2008 | Rackley, III et al. |
| 2008/0148408 A1 | 6/2008 | Kao et al. |
| 2008/0162271 A1 | 7/2008 | Benjamin |
| 2008/0162341 A1 | 7/2008 | Zimmer et al. |
| 2009/0001159 A1 | 1/2009 | James et al. |
| 2009/0055296 A1 | 2/2009 | Nelsen |

(56) References Cited

U.S. PATENT DOCUMENTS

| | | | |
|---|---|---|---|
| 2009/0063530 A1 | 3/2009 | Lee et al. | |
| 2009/0157554 A1 | 6/2009 | Hobson et al. | |
| 2009/0265269 A1* | 10/2009 | Stoecker | 705/39 |
| 2009/0298427 A1 | 12/2009 | Wilkinson et al. | |
| 2009/0327129 A1* | 12/2009 | Collas et al. | 705/41 |
| 2009/0327441 A1 | 12/2009 | Lee et al. | |
| 2010/0005025 A1 | 1/2010 | Kumar et al. | |
| 2010/0036524 A1 | 2/2010 | Chirco | |
| 2010/0063906 A1 | 3/2010 | Nelsen et al. | |
| 2010/0076833 A1 | 3/2010 | Nelsen | |
| 2010/0130172 A1 | 5/2010 | Vendrow et al. | |
| 2010/0200653 A1* | 8/2010 | Wolfe et al. | 235/379 |
| 2010/0280906 A1 | 11/2010 | Lim et al. | |
| 2010/0280911 A1* | 11/2010 | Roberts et al. | 705/21 |
| 2010/0299194 A1 | 11/2010 | Snyder et al. | |
| 2011/0082772 A1 | 4/2011 | Hirson | |
| 2011/0087592 A1 | 4/2011 | van der Veen et al. | |
| 2011/0112919 A1 | 5/2011 | Gray | |
| 2011/0173083 A1 | 7/2011 | Reed et al. | |
| 2011/0196753 A1 | 8/2011 | Hodgdon et al. | |
| 2011/0270693 A1 | 11/2011 | Paschini et al. | |
| 2011/0276437 A1 | 11/2011 | Mullen et al. | |
| 2011/0282784 A1 | 11/2011 | Nelsen | |
| 2011/0295744 A1 | 12/2011 | Wisniewski et al. | |
| 2012/0072298 A1 | 3/2012 | Ramanujam et al. | |
| 2012/0150731 A1 | 6/2012 | Isaacson et al. | |

FOREIGN PATENT DOCUMENTS

| | | |
|---|---|---|
| GB | 2333878 A | 8/1999 |
| WO | 04001646 A | 12/2003 |
| WO | 2004012118 A | 2/2004 |
| WO | 2005098770 A | 10/2005 |
| WO | 2008005018 A | 1/2008 |

OTHER PUBLICATIONS

The Examiner defines "associated" as "connected, joined, or related, especially as a companion or colleague." See Random House Dictionary (2012) (3 pages).

Internet Archive Wayback Machine, "SwapAgift: Where Gift Cards Meet Their Match", http://www.swapagift.com/CashforyourCard.aspx, dated 2003, 1 page.

PRWeb Online Visibility from Vocus, "Swapagift.com Expands its "Cash for Your Card" Program", dated Dec. 31, 2003, 1 page.

"Hypercom Introduces Quick-Service Payment Options for the Retail and Restaurant Countertop and Drive Through", Business Wire Apr. 11, 2002.

Dahl, Judy "Card Fraud", Credit Union Magazine, Jun. 2006, pp. 46-51.

Eazel, William, "Paypal intros SMS Payments," http://www.v3.co.uk/articles/print/2152694, vnunet.com, Mar. 24, 2006, 1 page.

European Search Report, Application No. 04256999.6-2412, dated May 7, 2007.

International Search Report, PCT Application No. PCT/US07/66300, dated Nov. 13, 2007, 7 pages.

International Search Report, PCT Application No. PCT/US07/66598, dated Nov. 13, 2007, 3 pages.

Michlig et al. "Fork in the Road", Credit Card Management, V22, n10 Oct. 1999, pp. 36-38.

Nelsen, David A., "Systems and Methods to Manage and Control Use of a Virtual Card", U.S. Appl. No. 13/158,349, filed Jun. 6, 2011, 62 pages.

WIPO, International Search Report dated Mar. 3, 2004, International Patent Application No. PCT/US02/30281, 5 pages.

* cited by examiner

PROCESSING VALUE-ASCERTAINABLE ITEMS

CROSS-REFERENCE TO RELATED APPLICATION

This application claims the benefit as a Divisional of application Ser. No. 12/903,987, filed Oct. 30, 2010 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s); which claims the benefit of priority from U.S. Provisional Application No. 61/266,910 filed Dec. 4, 2009, entitled "SYSTEMS AND TECHNIQUES FOR PROCESSING GIFT CARD INFORMATION"; the entire content of which is incorporated by this reference for all purposes as if fully disclosed herein.

FIELD OF THE INVENTION

The present invention relates to using value-ascertainable items, including stored-value instruments, to purchase goods or services in contexts in which the value-ascertainable items were not previously accepted as payment. More specifically, techniques are provided that allow stored-value instruments issued by one entity to be used to pay for goods or services provided by another entity that is unaffiliated with the issuer. Techniques are also provided to support the sale of stored-value instruments in an unaffiliated environment in a safe and secure manner.

BACKGROUND

A stored-value instrument is a financial instrument, usually structured as a means for payment, in which funds are associated with the instrument and not necessarily associated with any individual. Other types of financial instruments include credit cards and debit cards. Gift and pre-paid cards are a common form of stored-value instrument. Gift cards in particular have become extremely popular in recent years. Gift cards essentially relieve the donor of the burden of selecting a specific and individually appropriate gift for the recipient, instead allowing the recipient to choose, from the range of products sold by the issuer, the actual goods or services s/he wishes upon redemption. Most gift cards resemble credit cards in size and composition, although increasingly gift cards are becoming virtualized for delivery and redemption across digital networks. Gift cards also tend to display a specific theme that corresponds to the issuer of the card. Although gift cards are typically identified by a specific number or code, gift cards are typically not associated with an individual name or account. Thus, gifts cards can be used by anybody. In order to support gift cards, an issuer of gift cards maintains (directly or indirectly) an on-line electronic system for authorization and accounting of gift cards issued by the issuer. Some gift cards can be "reloaded" with additional monetary value. Thus, the funds associated with such gift cards can be depleted and replenished multiple times.

One disadvantage of gift cards over other forms of payment is that many gift cards have an expiration date, which may vary between a few months to a few years. If the holder of a gift card does not use the gift card before the expiration date, then the issuer of the gift card may deplete or completely eliminate the associated credit from the associated card. Alternatively, due to laws in some states, the funds represented by the gift card may be claimed by the state in which the issuer resides or where the purchase of the gift card took place as "lost property."

Another disadvantage of gift cards is that gift cards can only be used to make purchases from merchants designated by the issuers of the gift cards. Typically, the issuers of the gift cards only designate themselves. For example, a CompanyX's gift card can only be used at a CompanyX's store (whether online or in a "brick and mortar" store). The CompanyX's gift card cannot be used to purchase items from CompanyY because CompanyY does not recognize CompanyX's gift card as valid payment. Further, CompanyY is incapable of removing any balance from CompanyX's gift card. In this way, gift cards are considered "closed-loop" stored-value instruments. With respect to CompanyX's gift card, CompanyY is said to be "outside of the loop." A closed-loop stored-value instrument (or simply "closed-loop instrument") is typically sold by an individual retailer, serviced by the retailer (or its agents), and is accepted for purchases only at that particular retailer's locations. Another characteristic of a closed-loop instrument is that such an instrument is issued by an entity and liability is incurred by the same entity. For example, a merchant (such as CompanyX) issues a gift card with a positive balance and, upon issuance, incurs liability to offer goods or services in exchange for the monetary value reflected by the balance on the gift card. The gift card may only be used to purchase goods or services from that particular merchant.

Yet another disadvantage of a gift card is that, because it may be used only for goods or services offered by the issuer, a gift card recipient may not be able to fully utilize the card and put it to its best use. For example, the recipient of the gift card may not wish to purchase any of the goods or services offered by the issuer, or may have more of a need to purchase goods or services from another merchant. Or there may not be a stored location convenient to the recipient such that the card is not convenient to use. In these instances, the recipient may prefer to receive the market value for the card in cash or may prefer to deploy the market value of the card against a purchase at another merchant, rather than have the card either expire or simply go unused.

In some situations, a holding company may own multiple merchants, and allow its gift cards to be used at any of the merchants that it owns. However, even in this situation, the issuing entity and the entity that incurs the liability are the same. Consequently, even though one of the gift cards issued by the holding company may be labeled with one of its merchants and used to purchase an item from another of its merchants, such gift cards are still closed-loop instruments. With respect to gift cards issued by the holding company, the multiple merchants owned by the holding company are considered to be "inside the loop."

In contrast, an "open-loop" instrument is an instrument that is issued by a bank or other financial institution that has a banking license. A banking license requires its holder to comply with general banking regulations to which issuers of closed-loop instruments need not comply. Open-loop instruments, unlike closed-loop instruments, also may operate over debit or credit networks, carry a network logo (e.g., Visa®), and can be used at any retail location that accepts the payment form. Common open-loop instruments include debit cards that are issued by banks and credit cards that are issued by Visa®, MasterCard®, American Express® or Discover®. When a customer with an open-loop instrument completes a purchase from a merchant using the open-loop instrument, the customer incurs liability to pay the issuing bank while the issuer of the open-loop instrument authorizes and settles against the liability.

Some instruments may be considered "semi-open" in that they may be accepted by a limited number of different merchants. An example of such an instrument is a "mall card" that is accepted by most or all merchants in a particular mall. Another example of such an instrument is a "university card" that is accepted by most or all merchants located on or around a particular university's campus. These "semi-open" instruments are considered closed-loop because the issuer is not a financial institution that is required to have a banking license and the merchants that accept the instruments are limited to those designated by the issuer of the instrument.

Based on the foregoing, what is needed is a way for a gift card holder to maximize the value of a gift card while being able to avoid some of its drawbacks.

DETAILED DESCRIPTION

Figure 1:
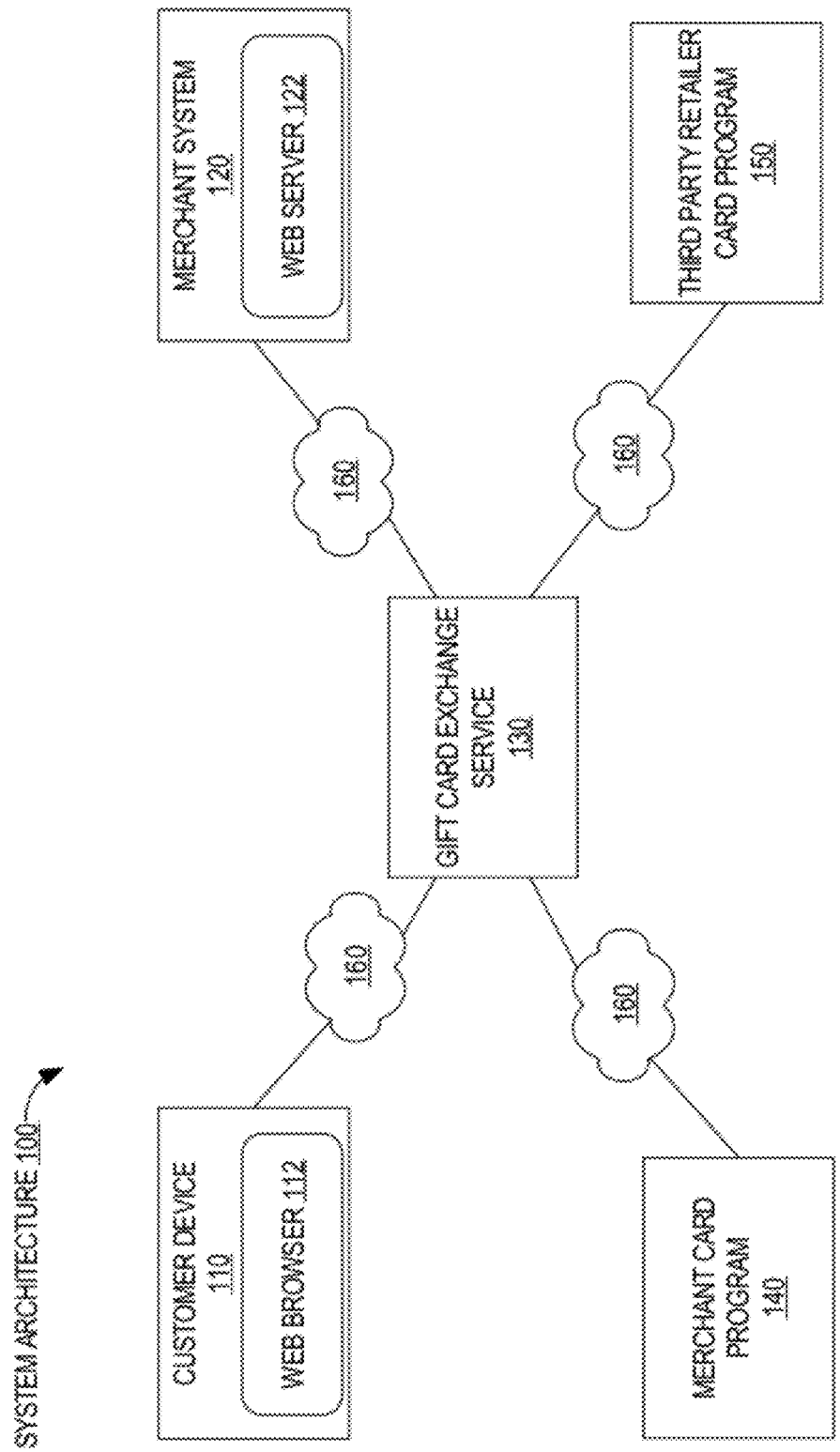
FIG. 1 is a block diagram that depicts an example system architecture that supports the use of closed-loop instruments to purchase items from a merchant that is "outside of the loop," according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Extending Liquidity to Value-Ascertainable Items

The Internet has enabled the development of markets in select goods that have only been supported thus far by in-person, physical trade. Several techniques are described herein for extending the liquidity created by such markets into a payment means of tender. Although the examples that shall be given hereafter are in the context of closed-loop stored-value instruments, the techniques described herein may be applied to any items whose values are reasonably ascertainable without having the items present. Such items are referred to herein as "value-ascertainable items."

A closed-loop stored-value instrument (such as a gift card) is merely one example of a value-ascertainable item. Other examples include baseball cards, rare coins, gems, comic books, etc. As used herein, "value-ascertainable item" includes closed-loop stored-value instruments, but does not include traditional forms of payment, such as cash, credit cards, and debit cards.

Virtually any item may be a value-ascertainable item as long as there is an authoritative source for ascertaining the value of the item without the item itself being present. The authoritative source may be a recognized "pricing guide" for a particular type of item, or may be empirically derived. For example, the average selling price of identical items in an online auction system may be established as the authoritative source for the value of an item.

Applying the techniques described hereafter to value-ascertainable items, a cell phone may be used to purchase concert tickets and vice versa as long as the value of the cell phone and the value of the concert tickets may be ascertained to a reasonable degree of accuracy. As another example, if the value of a set of music CDs and an item of clothing may be ascertained, then that set of CDs may be used to purchase the item of clothing and vice versa.

In an embodiment, a value-ascertainable exchange service (or VAES) (similar to gift card exchange server 130 that shall be described hereafter) hosts a website where a user (e.g., using a web browser) searches for an item and requests to pay for the item using a second item. In response, the VAES determines the value of the second item from an authoritative source. The VAES then determines an offer for the second item based on the value that the authoritative source provided for the second item. As shall be explained in greater detail hereafter in the context of closed-loop stored-value instruments, the offer value may be greater than, the same, or less than the determined value of the second item. Typically, however, the offer value will be less than the determined value of the second item.

If the user accepts the offer, the VAES applies the offered amount towards the purchase of the first item and the user pays the difference. If the offered amount is more than the price of the first item, then the VAES may pay the full price, and pay the user the difference in the form of cash or credit.

Creating Liquidity in Closed-Loop Stored Value Instruments

As mentioned above, closed-loop stored-value instruments are a common example of value-ascertainable items. The techniques described hereafter include techniques in which a close-loop stored-value instrument is used as a payment means at an outside-the-loop merchant. One of the techniques involves using a closed-loop stored-value instrument (i.e., that is issued by one party that does not have a banking license) as a means to pay, in whole or in part, for a purchase from a non-issuing party. For example, a CompanyX gift card is used to make a purchase at CompanyY, where CompanyY is outside the loop designated by CompanyX. Such a transaction is made possible through an intermediary. In some embodiments, the intermediary has a business relationship with both the gift card's issuer (which is typically a retailer) and the non-issuing merchant. In alternative embodiments, the intermediary facilitates the transaction without having any particular business relationship with the gift card issuer.

The following is a brief non-limiting example of the steps that may be performed to allow a customer to use a CompanyX gift card to make a purchase at a CompanyY store. This is referred to as "POS (or Point of Sale) Payment" because the gift card is used "at the point of sale." Hereafter, POS Payment will be contrasted with "Online Payment,"

which is the use of a gift card to make a purchase in an online setting. These techniques may also be used to generate an offer to purchase a closed-loop card in a plurality of settings at its market value as determined by a network operator.

At check-out, after one or more of the customer's desired items have been scanned for purchase, the customer, using a graphical user interface (GUI) on a display device, selects a drop-down menu that lists multiple merchants, including CompanyX. The customer selects CompanyX and then enters a number indicated on the CompanyX gift card or swipes the CompanyX gift card through a card reader. CompanyY's payment system routes the gift card data to a third party intermediary, referred to hereinafter as a "gift card exchange service," which in turn routes that information to CompanyX's gift card processing system. Based on the gift card data, the gift card exchange service determines whether the CompanyX gift card is valid and, if valid, determines the balance on the CompanyX gift card. If the gift card exchange service determines that the gift card is valid and that there is balance remaining on the gift card, then the gift card exchange service sends, to CompanyY's payment system, value data that indicates an amount that CompanyY's payment system may apply to the total purchase price of the scanned items. In other words, the gift card exchange service converts the value of the gift card to an acceptable payment type that CompanyY recognizes.

Although the term "gift card" is used herein to describe embodiments of the invention, embodiments of the invention are not limited to gift cards or even to cards. Other non-limiting examples of closed-loop stored-value instruments include pre-paid cards, post-paid cards, smart cards, merchandized credit, layaways, virtual currencies, airline miles, residual insurance values, etc.

System Architecture

FIG. 1 is a block diagram that depicts an example system architecture 100 that supports the use of gift cards to purchase items from a merchant that is "outside of the loop," according to an embodiment of the invention. FIG. 1 depicts five systems, two of which are from the same party. The five systems include: (1) a customer's web browser 112 that executes on customer's device 110; (2) a merchant's web server 122 that executes on merchant system 120; (3) a gift card exchange service 130; (4) a merchant card program 140; and (5) a third party retailer card program 150, where the third party retailer is the issuer of the gift card in question. Merchant system 120 and merchant card program 140 are part of the out-of-loop merchant's payment system. Merchant card program 140 may be operated by another party (e.g., First Data Valuelink™ or Comdata SVS™) that provides card management services to multiple merchants that issue their own gift cards.

Customer device 110 is not limited to any particular device. Non-limiting examples of customer device 110 include a laptop computer, a desktop computer, a cell phone or a PDA.

Although gift card exchange service 130 is depicted as a single device in FIG. 1, gift card exchange service may comprise multiple devices that perform in concert to provide a gift card service to the customer through the merchant. In one embodiment, a gift card exchange service is an entity that employs a network to facilitate the purchase and sale of closed-loop stored-value instructions, an example of which is gift cards. An example of gift card exchange service 130 is Plastic Jungle.

Each of the five systems may communicate via respective networks 160. Alternatively, merchant system 120 and merchant card program 140 do not communicate over a network 160, but rather communicate over a direct link. Network 160 may be implemented by any medium or mechanism that provides for the exchange of data between various nodes in the network. Examples of such a network include, without limitation, a network such as a Local Area Network (LAN), Wide Area Network (WAN), Ethernet, and/or the Internet, and/or one or more terrestrial, satellite, or wireless links. The network may include a combination of networks such as those described. The network may transmit data according to Transmission Control Protocol (TCP), User Datagram Protocol (UDP), and/or Internet Protocol (IP), for example.

Processing a Third Party Retailer Gift Card—Online Payment

Figure 2A:
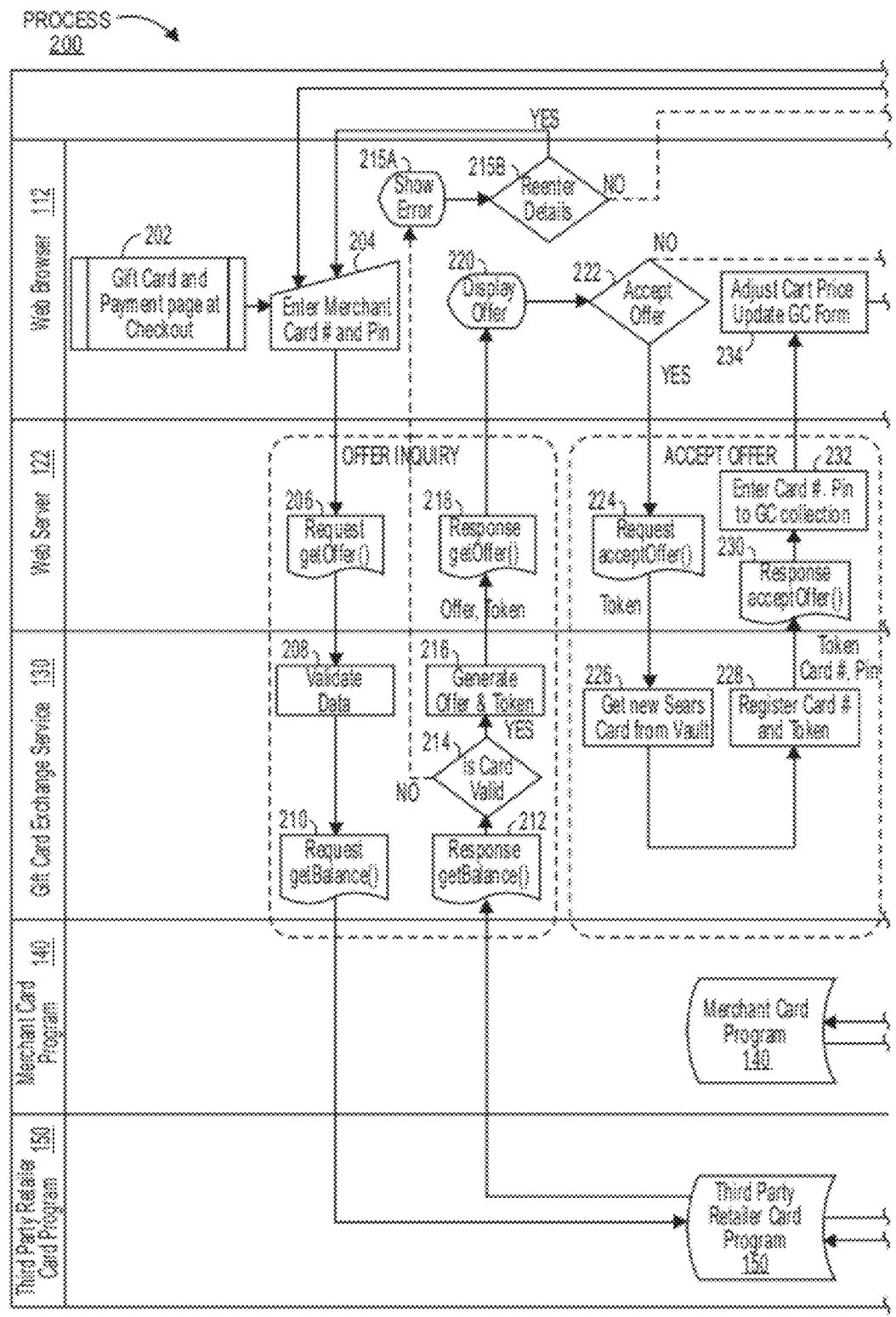
FIGS. 2A-B are flow diagrams that depict a process for allowing a customer to use a closed-loop instrument to purchase items from a merchant that is "outside of the loop," according to an embodiment of the invention.
Figure 2B:
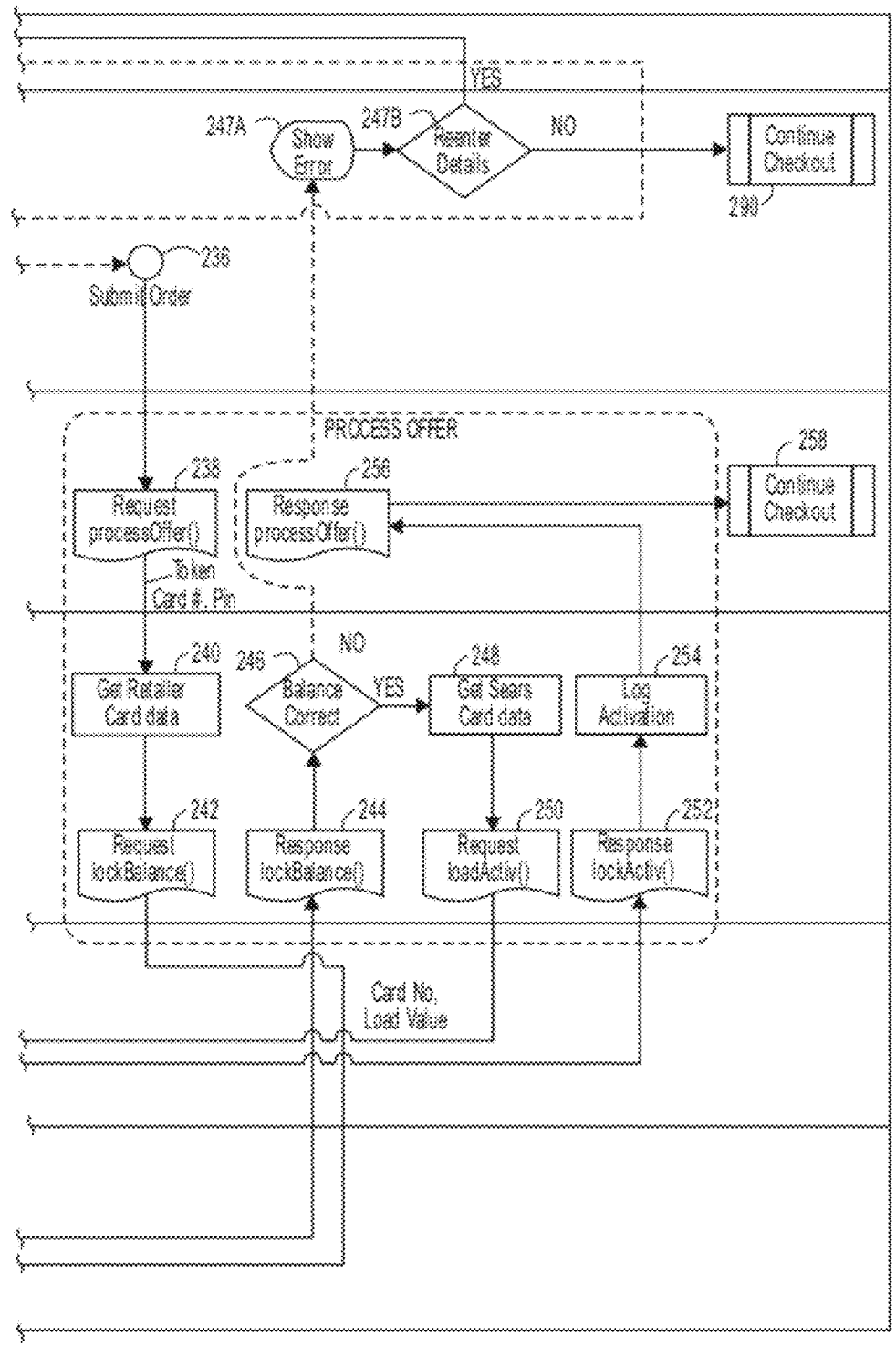

FIGS. 2A-B are flow diagrams that depict a process 200 for allowing a customer to use a gift card to purchase items from a merchant that is "outside of the loop," according to an embodiment of the invention. Process 200 is described in the context of "Online Payment," i.e., where a gift card is used to make a purchase in an online environment, as opposed to POS Payment, described above. As shall be described in greater detail hereafter, many of the steps in process 200 that are performed by gift card exchange service 130 in the online payment scenario are also performed by gift card exchange service 130 in the POS Payment scenario.

For the purposes of explanation, the party that issued the gift card is referred to herein as the "issuing merchant" and the party from which the purchase is made is referred to herein as the "outside-the-loop merchant." As indicated above, FIG. 2 is an example of an online check-out flow at an outside-the-loop merchant's website.

Process 200 begins at step 202, where web browser 112 displays a payment page (provided by merchant web server 122 or, alternatively, by gift card exchange service 130 acting as a payment service operator) that allows the user to enter payment information in order to complete a purchase of one or more items, whether goods, services, or non-traditional items such as virtual currency used in online gaming. The payment page includes page elements that allow the consumer to (a) select a third party retailer from among a plurality of third party retailers and (b) enter information of a gift card issued from the selected third party retailer. The page elements may be a drop down menu, a set of radio buttons, or any other visual model.

At step 204, the customer enters information that identifies the gift card, such as the gift card's number and, if necessary, a personal identification number (PIN). The customer then submits the gift card information. Alternatively, the customer may have an account with the gift card exchange service 130, and the customer may enter information that identifies the customer. Based on the customer's identity and information previously registered with the gift card exchange service 130, the gift card exchange service 130 may determine which gift cards the customer has available for use. The gift card number, or the customer's identity, are merely examples of the type of information that may be used by the gift card exchange service 130 to determine the gift card(s) that are involved in the transaction.

For the purpose of explanation, it shall be assumed that the customer desires to use a single gift card to make the purchase. However, the customer may alternatively specify and use multiple gift cards during a single purchase.

Offer Inquiry

At step 206, merchant's web server 122 receives the gift card information, including data that identifies the third party retailer. Step 206 also includes merchant web server 122 sending an offer request to gift card exchange service 130 to obtain, for the customer, an offer for the gift card.

In an embodiment, card information that is sent between web server 122 and gift card exchange service 130 and between gift card exchange service 130, merchant card program 140, and third party retailer card program 150 is first secured. A non-limiting example of a protocol that parties 120, 130, 140, and 150 may rely on for secure data transmission over a network is HTTPS.

Validating

At step 208, in response to receiving the request from merchant web server 122, gift card exchange service 130 performs a validation step based on the data in the request. Gift card exchange service 130 may "validate" the third party retailer, the outside-the-loop merchant, or both, in step 208. For example, gift card exchange service 130 may determine whether the outside-the-loop merchant that sent the request is an outside-the-loop merchant that gift card exchange service 130 recognizes as a merchant. If so, gift card exchange service 130 may determine, based on the request, whether the pending transaction is "in-store" or on-line. If the pending transaction is "in-store" and there is no magnetic strip data (i.e., which would be generated by physically swiping the retailer gift card through a card reader) that accompanies the request, then gift card exchange service 130 may determine not to proceed with generating an offer for the third party retailer gift card without additional data, such as a PIN.

Similarly, if the pending transaction is online and there is no PIN that accompanies the request, then gift card exchange service 130 might determine not to proceed with generating an offer for the third party retailer gift card.

As another example of validation, gift card exchange service 130 may determine whether the third party retailer is a retailer that gift card exchange service 130 recognizes as a retailer. Additionally, gift card exchange service 130 may determine whether the entered gift card number (and optionally PIN) has the correct format known for that third party retailer. If gift card exchange service 130 determines that the gift card is not valid, then gift card exchange service 130 may reply to the request in step 206 with an error message (e.g., that indicates that the submitted gift card information is not valid). Merchant web server 122, in response, would provide an error message to web browser 112 to be displayed to the customer.

As another example of validation, gift card exchange service 130 may determine whether the gift card belongs to a list of blacklisted card numbers that are suspected of being acquired through fraudulent means. This blacklist may be maintained by gift card exchange service 130 or the issuing merchant or both. In addition to blacklisting a specific card number, the validation logic can be (a) built around any attribute of the card, issuing merchant, or out-of-the-loop merchant and (b) determined by the gift card exchange service 130 or issuing merchant.

Balance Response

If gift card exchange service 130 determines that the gift card is valid, then, at step 210, gift card exchange service 130 sends a balance request to retailer card program 150 (or alternatively, to a third party card management service, such as First Data™ or SVS™ discussed previously). The balance request includes the gift card number and, optionally, a PIN.

At step 212, gift card exchange service 130 receives, from retailer card program 150 (or third party card management service), a balance response message to the balance request sent in step 210.

At step 214, gift card exchange service 130 analyzes the balance response message to determine whether the gift card is valid. The gift card could be determined to be invalid in step 214 and not in step 208 if the gift card number entered by the customer has the correct format for the retailer but (a) the gift card number does not exist, (b) the gift card had expired, (c) the gift card no longer has a balance, (d) the gift card has been deactivated, or (e) the gift card has been marked for fraud. If the response in step 214 indicates that the gift card is invalid, then an error report is generated and sent from retailer card program 150 to gift card exchange service 130. Gift card exchange service 130 might handle the error or change the error code and description and send an error to merchant system 120. Merchant system 120 can also modify the error code and description before sending it to web browser 112 to be displayed (at step 215A). At step 215B, the customer is presented an option to reenter details about the gift card. If the customer selects the option, then the process proceeds to step 204. If the customer does not selection the option, then process 200 proceeds to step 290 where an existing checkout process is utilized, i.e., without using the gift card.

If the balance response message received in step 212 indicates that the gift card is valid, then the balance response message indicates a balance for the gift card and process 200 proceeds to step 216.

At step 216, gift card exchange service 130 generates, based on the balance for the gift card, an offer for the gift card. The value specified in the offer (referred to herein as the "offer value") may be greater than, less than, or equal to the balance indicated in the response received in step 212. In most cases, the offer value is likely to be less than the balance of the gift card. For example, for a $100 CompanyX card, gift card exchange service 130 might offer $90.

In other cases, the offer value may be the same as or more than the balance on the gift card. For example, gift card exchange service 130 might offer $100 for a $100 CompanyX gift card. As yet another example, as part of a promotion by CompanyY or gift card exchange service 130, gift card exchange service 130 might offer a $110 for a $100 CompanyX gift card. In yet other cases, the offer value may be in a different currency.

Varying Offer Depending on Various Factors

In an embodiment, gift card exchange service 130 takes into account one or more factors (other than the balance of the gift card) to determine an offer for the gift card. These factors are not limited to the Online Payment or POS Payment scenarios. In fact, these factors may be used whenever an offer for a customer's gift card is determined.

One factor may be physical presence of the gift card. Thus, if the customer is purchasing one or more items at an outside-the-loop merchant's "brick and mortar" store and presents his/her physical gift card, then the offer would be greater than if the customer were purchasing one or more items online and enters the gift card information into a user interface (e.g., a web browser). For example, an offer for a $100 "physical" gift card may be $90 whereas an offer for a $100 "virtual" gift card may be $80.

Other factors to determine how much the gift card exchange service offers for a gift card may be related to information known about the customer. Non-limiting examples of such factors include credit score of the customer, whether the customer has registered with the entity that operates gift card exchange service 130, and whether the customer has agreed to have his/her credit card charged in case the customer (or someone else) attempts to use the gift card after acceptance of the offer. This last factor is important in the scenario where gift card exchange service 130 does not "lock" the gift card upon the customer's acceptance of the offer, where locking ensures that the gift card's balance cannot be reduced.

Multiple Offers Per Card

In one embodiment, an "offer engine" operated by gift card exchange 130 presents to a customer multiple offers for a single gift card during the same transaction. The multiple offers may presented all at once or sequentially. For example, in an embodiment that presents multiple offers all at once, the user may be presented with several dollar amounts, and the actions that must be taken to qualify for those dollar amounts. For example, for a single gift card worth $100, the offer engine may indicate:
$75 (with no further information)
$80 (with submission of valid credit/debit card information)
$85 (registered user with no registered credit/debit card)
$90 (registered user with registered credit/debit card)

By presenting the user with the various offer amounts at once, the user may have more incentive to provide the additional information required to obtain the better offers. In this example, a customer that provides credit/debit card information obtains a better offer because the gift card exchange service 130 may debit the credit card in case the customer does not keep to any agreements entered into with gift card exchange service 130. Further, a customer that is registered with the gift card exchange service 130 is entitled to a better offer because the customer represents less risk to the gift card exchange service 130 (assuming that the customer has a problem-free history of gift card purchases and/or trade-ins).

As an example of a sequential increase in the offer amounts, a customer, presently unidentified to gift card exchange service 130, may receive from the offer engine a $75 "current offer" for the $100 gift card. If the customer signs into an account at the gift card exchange service 130, the current offer may increase to $85. If the customer then registers credit card information, the current offer may increase to $90.

Non-Monetary Offers

The offers presented by the offer engine may be monetary (e.g. $70 for a $100 gift card) or non-monetary. For example, instead of or in addition to an offer of $70, the offer engine could offer a gift card issued by Retailer B worth $80 in goods and services at Retailer B, or offer to load talk time into a mobile phone plan for the customer worth $90. The offers presented by the offer engine may even be combinations of monetary and non-monetary items. For example, the offer engine may present the following offers for a $100 gift card for Retailer A:
$75
$10 and $90 gift card for Retailer B
$50 gift card for Retailer B and $55 gift card for Retailer C
10,000 "gold coins" in a virtual game currency

Alternative Balance Response—Web Data Harvesting

Many gift card issuers offer card holders the ability to view the current balance on a gift card. For example, a card holder, using a web browser, sends a request for a "balance inquiry" web page from a website of the third party retailer. The balance inquiry web page will typically have controls that allow the card holder to enter information that uniquely identifies a gift card. The information entered by the user is sent back to the website of the third party retailer. The website responds by sending back a "current balance" web page to the card holder. The current balance web page indicates the current balance associated with the gift card.

According to one embodiment, instead of sending a balance request to retailer card program 150 (or alternatively, to a third party card management service) in step 210, gift card exchange service 130 makes use of the balance inquiry mechanism that the third party retailer makes available to card holders. Specifically, in one embodiment, a process executed by the gift card exchange service (referred to herein as a "balance inquiry bot") interacts with the website of the third party retailer in the same manner as a card holder, to retrieve the balance inquiry web page, fill out the balance inquiry web page, receive the current balance web page, and extract the current balance amount from the current balance web page. Because the balance inquiry bot needs to parse the web pages it receives from the third party retailer's website in order to extract specific pieces of information (e.g. the current balance), the process performed by the balance inquiry bot is referred to as "Web data harvesting." Thus, Web data harvesting simulates human Web browsing.

In an embodiment that uses a balance inquiry bot, step 210 may involve gift card exchange service 130 (or another process) using a balance inquiry bot to request and receive a balance inquiry webpage of the third party retailer's website. Typically, the balance inquiry webpage includes one or more text entry fields for entering necessary card information, such as a gift card number and a PIN. The balance inquiry bot enters the necessary card information based on information received from the card holder and submits the card information to the retailer's website.

In step 212, gift card exchange service 130 receives, in response to the submission, a current balance webpage that contains data indicating the current balance of the gift card and analyzes the second webpage to extract from the web page the text that indicates the current balance. If the card number and/or PIN of the gift card are invalid, then the second webpage will so indicate. Additional details related to "Web data harvesting" are described below.

Through the use of a balance inquiry bot, gift card exchange service 130 can use publicly available information to determine the current balance of a gift card without gift card exchange service 130 having to integrate with a retailer's card program.

Embodiments of the invention are not limited to any particular means or mechanism for determining the current balance of a gift card. For example, instead of submitting a request for a webpage of the third party retailer's website, gift card exchange service 130 might submit a SQL query to a relational database that stores balance information of a number of gift cards issued by the retailer.

Tokenization

In one embodiment, gift card exchange service 130 generates a unique token at step 216, which gift card exchange service 130 associates with the offer and the gift card information. Step 216 also comprises sending the offer and token to web server 122.

One purpose for a token is to associate the offer with a lifetime. As long as gift card exchange service 130 recognizes the token, gift card exchange service 130 will honor the offer. In the in-store scenario, the lifetime of a token (and, thus, the lifetime of the offer) may only be a few minutes or less. In the online scenario, the lifetime of a token may be a number of days. This difference in respective lifetimes reflects the difference in how online sessions may last compared with in-store purchases where the time to deliberate on which manner of payment will be used is relatively short.

Another purpose for a token is to prevent the gift card information from potentially being stolen if the outside-the-loop merchant's systems are compromised, e.g., by a hacker. Because gift card exchange service 130 maintains an association between a token and a third party retailer's gift card information, the outside-the-loop merchant does not need to store the gift card information as long as the outside-the-loop merchant retains the token.

While the technique illustrated in FIG. 2 involves using a token, alternative embodiments do not generate a token. In such other embodiments, the card information or some other identifier may be used to keep track of the card and corresponding offer.

At step 218, merchant web server 122 forwards the offer to web browser 112 to be displayed to the customer at step 220.

At step 222, the customer submits data (e.g., via a keyboard entry or a mouse click on a UI control) that indicates that the customer either accepts or rejects the offer. If the customer rejects the offer, then process 200 proceeds to step 290 where an existing checkout process is utilized, i.e., without using the gift card. For example, web browser 112 might display a page that allows the customer to enter credit card information in order to complete the purchase.

If the customer submits data that indicates that the customer accepts the offer, then the process proceeds to the accept offer stage, which begins at step 224.

Accept Offer

At step 224, merchant web server 122 receives, from web browser 112, data that indicates that the customer accepted the offer. In response to this data, web server 122 sends an accept offer message to gift card exchange service 130. The accept offer message may include the token and offer ID that gift card exchange service 130 generated in step 216.

At step 226, gift card exchange service 130 receives the accept offer message. In an embodiment, the accept offer message includes the retailer gift card information instead of the token. However, similar to other messages described herein, an accept offer message may not be needed to complete the transfer of balance.

Applying Offer Amount to a Merchant Card

According to one embodiment, the amount of the offer is added to a merchant card, and the merchant card is applied to the purchase. In such an embodiment, step 226 also comprises gift card exchange service 130 retrieving a new merchant gift card number (and, optionally, a PIN). The new merchant gift card number identifies an inactive account that has a zero balance. The new merchant gift card number may be from a list of valid numbers that gift card exchange service 130 maintains for the outside-the-loop merchant and that the outside-the-loop merchant previously provided to gift card exchange service 130, or may be generated by a coupon engine or other means to accept value at checkout. Alternatively, the new merchant gift card number may be requested (not shown) from merchant web server 122 (or another process executing on a device maintained by the outside-the-loop merchant) that stores valid gift card numbers. The new gift card number represents a virtual gift card from the outside-the-loop merchant. The virtual gift card might not be activated or involved in processing the transaction.

At step 228, gift card exchange service 130 registers the token, the new merchant gift card number, and, optionally, the PIN by storing an association between the token and the new merchant gift card number. Step 228 also comprises gift card exchange service 130 sending the token, the new merchant gift card number, and PIN to merchant web server 122.

At step 230, merchant web server 122 receives the token, new merchant gift card number, and PIN as a response to the accept offer message sent in step 224.

At step 232, merchant web server 122 adds the new gift card number and PIN to the collection of gift card numbers that are recognized by the outside-the-loop merchant. Step 232 also comprises merchant web server 122 sending data that updates the total purchase price to reflect the offer value that is applied to the total purchase price. For example, if the total purchase price is $200 and the offer value for a $100 gift card is $90, then the updated total purchase price will be $110. As another example, if the total purchase price is $80 and the offer value is $90, then the total purchase price will be $0. The scenario in which the offer value is greater than the total purchase price is described in more detail below.

At step 234, web browser 112 adjusts the total purchase price based on the data sent from merchant web server 122. Notably, at this point in process 200, the third party retailer gift card is not modified and the balance of the gift card is not locked. Therefore, the customer has not lost any value associated with the gift card. Similarly, the new merchant account identified by the new merchant gift card number is still inactive and has a zero balance. Thus, there is no change in liability associated with the new merchant account.

Persisting the Accepted Offer

After the customer accepts the offer and before completion of the purchase, the customer might modify the set of one or more items that are part of the purchase. This set of items is said to be in the customer's "cart." In an embodiment, gift card exchange service 130 stores, for a period of time, acceptance data that indicates acceptance of the offer. Such persistence allows the customer to modify his/her cart after acceptance of the offer and before completion of the purchase. Furthermore, the acceptance data may be used in a different session between web browser 112 and web server 122. For example, the customer may choose to not complete the purchase. Later, while attempting to make another purchase (e.g., of the same or different items), the customer may enter in the same third party gift card information as entered in step 204 during a previous session. Gift card exchange service 130 may then determine that the gift card information is the same gift card information entered in the previous session and, based on the acceptance data, provide the same offer (via web server 122) to the customer.

Submission of the Order

At step 236, the customer submits the order, which step comprises web browser 112 sending submission data to merchant web server 122. The submission data indicates that the customer submitted the order.

However, instead of submitting the order, the customer might abandon the purchase (not depicted), e.g., by closing web browser 112 or via a selection of an "Abandon Purchase" button. Similarly, the customer may select an option to complete the checkout process without using the third party gift card. In this case, process 200 proceeds to step 290.

In both of these scenarios, the third party gift card is still not modified. The customer may use the full balance on the third party gift card for another purchase, whether at the third party retailer or another outside-the-loop merchant. Further, the virtual gift card remains inactive with a zero balance. The card number associated with the virtual gift card may be used for a subsequent transaction and associated offer. Therefore, in the case of customer abandonment of the purchase, there is no change in the financial value of any stored-value instruments.

Process Offer

At step 238, in response to receiving the submission data, merchant web server 122 sends a process offer request to gift card exchange service 130. The process offer request includes the token (generated in step 216) and/or the new merchant gift card number, and, optionally, the PIN (retrieved in step 230).

At step 240, in response to receiving the request and associated data, gift card exchange service 130 retrieves the retailer gift card information using the token included in the request of step 238. As noted above, gift card exchange service 130 stores an association between the token and the third party retailer gift card information.

At step 242, gift card exchange service 130 sends a lock balance request to retailer card program 150 to lock the balance on the third party retailer gift card (or, alternatively, to zero out the balance). The lock balance request includes any information that is needed to identify the third party retailer gift card, such as the retailer gift card number and, optionally, PIN. Once the retailer gift card is locked, then no other party (including the retailer) can use the funds associated with the retailer's gift card. The locked gift card acts as a deactivation of the gift card.

At step 244, gift card exchange service 130 receives, from retailer card program 150, a lock balance response message that indicates (1) that the balance is locked and (2) the balance of the third party retailer gift card. In an embodiment, some of the balance is used and the remaining balance is retained and useable.

Additional Balance Check

At step 246, gift card exchange service 130 determines whether the balance indicated in the response received in step 244 (referred to as the "post-offer balance") is the same as the balance indicated in the response received in step 212 (referred to as the "pre-offer balance"). If not, then gift card exchange service 130 sends, to merchant web server 122, an error message that indicates an error occurred. In turn, merchant web server 122 provides an error message to web browser 112, which displays the error message to the customer in step 247A. At step 247B, the customer is presented an option to reenter details about the third party gift card or another third party gift card. If the customer selects the option, then the process proceeds to step 204. If the customer does not select the option, then process 200 proceeds to step 290 where an existing checkout process is utilized, i.e., without using the gift card.

One reason why the post-offer balance may be different than the pre-offer balance is that there is an attempt to use the third party gift card to purchase another item after the balance request is processed by retailer card program 150 and before the lock balance request is processed by retailer card program 150. For example, a person attempts to use a CompanyX gift card to purchase an item online from CompanyY. After the person receives an offer for the CompanyX gift card, the person does not respond to the offer for a few minutes, hours, or days. While the offer is still pending, the same or different person attempts to the use the same CompanyX gift card to purchase another item, whether from CompanyX or another outside-the-loop merchant.

If the post-offer balance is the same as the pre-offer balance, then the process proceeds to step 248, where gift card exchange service 130 uses the token received in step 240 (and generated in step 216) to retrieve the new gift card data retrieved in step 226.

Load Offer Value Onto New Gift Card

At step 250, gift card exchange service 130 sends a load request to merchant card program 140. The load request includes the new gift card number and the offer value. In response, merchant card program 140 loads the offer value onto the account associated with the new gift card number. The stored-value instrument associated with the account is referred to herein as a virtual gift card.

At step 252, gift card exchange service 130 receives, from merchant card program 140, a response (to the request in step 250) that indicates that the load operation completed successfully.

At step 254, gift card exchange service 130 creates a record that stores details of the completed transaction and stores the record in a transaction log.

At step 256, merchant web server 122 receives, from gift card exchange service 130, a response to the process offer request sent to gift card exchange service 130 in step 238. If the pre-offer balance is the same as the post-offer balance and offer value was successfully loaded onto the virtual gift card, then the process proceeds to step 258 where merchant web server 122 continues with the checkout process.

Step 258 represents the final checkout stage where the customer may complete or abandon the purchase. The customer may complete the purchase by, e.g., selecting a "Complete Purchase" button displayed by web browser 112. Step 258 may further comprise merchant system 120 debiting at least a portion of the balance on the virtual gift card as payment for the intended purchase.

Gift Card Processing by a Party Other Than Issuer

As described above, gift card exchange service 130, like the outside-the-loop merchant, is not "part of the loop" associated with a third party gift card. Importantly, however, gift card exchange service 130 performs a number of actions with respect to a gift card that previously have only been performed by the issuer of the gift card. Such actions include activating a gift card, determining the balance of the gift card, locking the balance of the gift card, redeeming the value of the gift card, reloading value onto the gift card, and transferring the balance of the gift card.

Additional Checkout Scenarios

There are numerous checkout scenarios, some of which may depend on whether the offer value is greater than, equal to, or less than the original total purchase price. If the offer value (or the balance value loaded on the virtual card) is the same as or more than the original total purchase price, then step 256 does not require any more steps that pertain to payment. Instead, step 256 may further comprise sending, to web browser 112, display data that requests verification of other information about the customer, such as a mailing address and/or other contact information. Alternatively, the display data sent to web browser 112 might confirm that the online transaction is complete and that the item(s) purchased will be delivered (e.g., electronically or via mail).

If the offer value is more than the original total purchase price, then merchant web server 122 may send, to web browser 112, data about the virtual gift card (i.e., new merchant gift card number and PIN) to be displayed to the customer. Similarly, the outside-the-loop merchant may send an email to an email address of the customer where the email contains the virtual gift card information. Additionally or alternatively, the outside-the-loop merchant might mail, to a mailing address of the customer, a physical gift card that corresponds to the virtual gift card.

If the offer value is less than the original total purchase price, then step 256 may further comprise sending, to web browser 112, display data that requests the customer to submit additional payment information (e.g., a credit card number) to pay for the difference between the offer value and the original total purchase price. The single purchase of one or more items using two different payment instruments is known as a "split tender."

Alternative Checkout Flow

The above approach described in FIG. 2 is one example of a checkout flow, which is modified from a "normal" checkout flow where cash, check, a credit card, or a debit card is used. In an alternative embodiment, once a gift card of an issuing merchant is presented as payment for one or more items sold by an out-of-the-loop merchant, the card holder is presented with an interface provided by a gift card exchange service, where the gift card exchange service accepts payment.

For example, in an Online Payment scenario, once a user indicates, via web browser 112, to web server 122, that the user would like to use a gift card to make a purchase from an out-of-the-loop merchant, web server 122 directs the user to a web page provided by gift card exchange service 130. The gift card exchange service 130 directly receives (i.e., via web browser 112, but not via web server 122) all data entered by the user and directly sends (i.e., via web browser 112, but not via web server 122) any response data directly to customer device 110. At the end of a successful payment received by gift card exchange service 130, gift card exchange service 130 notifies web server 122 (or another computing element of the out-of-the-loop merchant). Gift card exchange service 130 remits payment to the non-issuing merchant upon completion of the transaction with the user or at some later time.

As another example in a POS Payment scenario, a user indicates, via a user interface presented at checkout, an option to pay by credit card, debit card, or a gift card exchange service, such as gift card exchange service 130. By selecting the latter option, the user is presented with a user interface provided by the gift card exchange service. The user interface instructs the user to scan the user's gift card. If the offer value for the gift card is less than the total purchase price at checkout, then the user pays for the difference by swiping a credit or debit card (or other form of payment) that the gift card exchange service accepts.

Virtual Currency

Instead of using third party gift cards to purchase traditional goods and services (such as food, clothes, appliances, and entertainment), third party gift cards may be used to purchase other non-traditional items, examples of which are nearly limitless. One popular example of a non-traditional item is virtual currency, which many online games employ.

As an example, an online GameX operated by CompanyZ may allow players to manage a virtual farm by planting, growing, and harvesting virtual crops and trees, and raising virtual livestock. The GameX may be based around a virtual market, where different virtual items can be purchased, including seeds, trees, animals, buildings, decorations, vehicles, and more land. Such purchases may be made using (1) "farm coins," which is the generic money of GameX (which is earned by selling crops) or (2) "farm cash," which a player earns based on the player's experience level. A player can also choose to buy GameX coins or cash from CompanyZ using an open-loop instrument such as a credit card.

Therefore, in an embodiment of the invention, an online game allows a player to enter details of a third party gift card owned by the player and receive virtual currency in exchange. For example, a player of GameX might enter the details of a CompanyZ gift card with a balance of $100 and, via messaging with gift card exchange service 130 (similar to the process described above), receive 1000 "farm coins" or $1000 in "farm cash." In this manner, any discount on the value of the gift card may be transparent to the user.

Therefore, a holder of a third party gift card may use the gift card to purchase a good or service from a outside-the-loop merchant without being notified of the actual dollar value represented by the purchased good or service. As another example, using gift card exchange service 130, a CompanyX gift card with a $100 balance may be exchanged for 40 weeks of a video service provided by a company that has no relationship with CompanyX.

Gift Card Exchange

In addition to the alternative embodiments described above, embodiments of the invention are not limited to the scenario where a holder of a third party gift card is attempting to purchase one or more items from another outside-the-loop merchant. For example, according to one embodiment, a holder of a gift card might desire to exchange the holder's gift card for another merchant's gift card. For example, a holder of a CompanyX gift card might want to exchange the CompanyX gift card for a CompanyY gift card. Thus, in this embodiment, an intermediary (such as gift card exchange service 130) provides a mechanism to make such an exchange possible.

Figure 3:
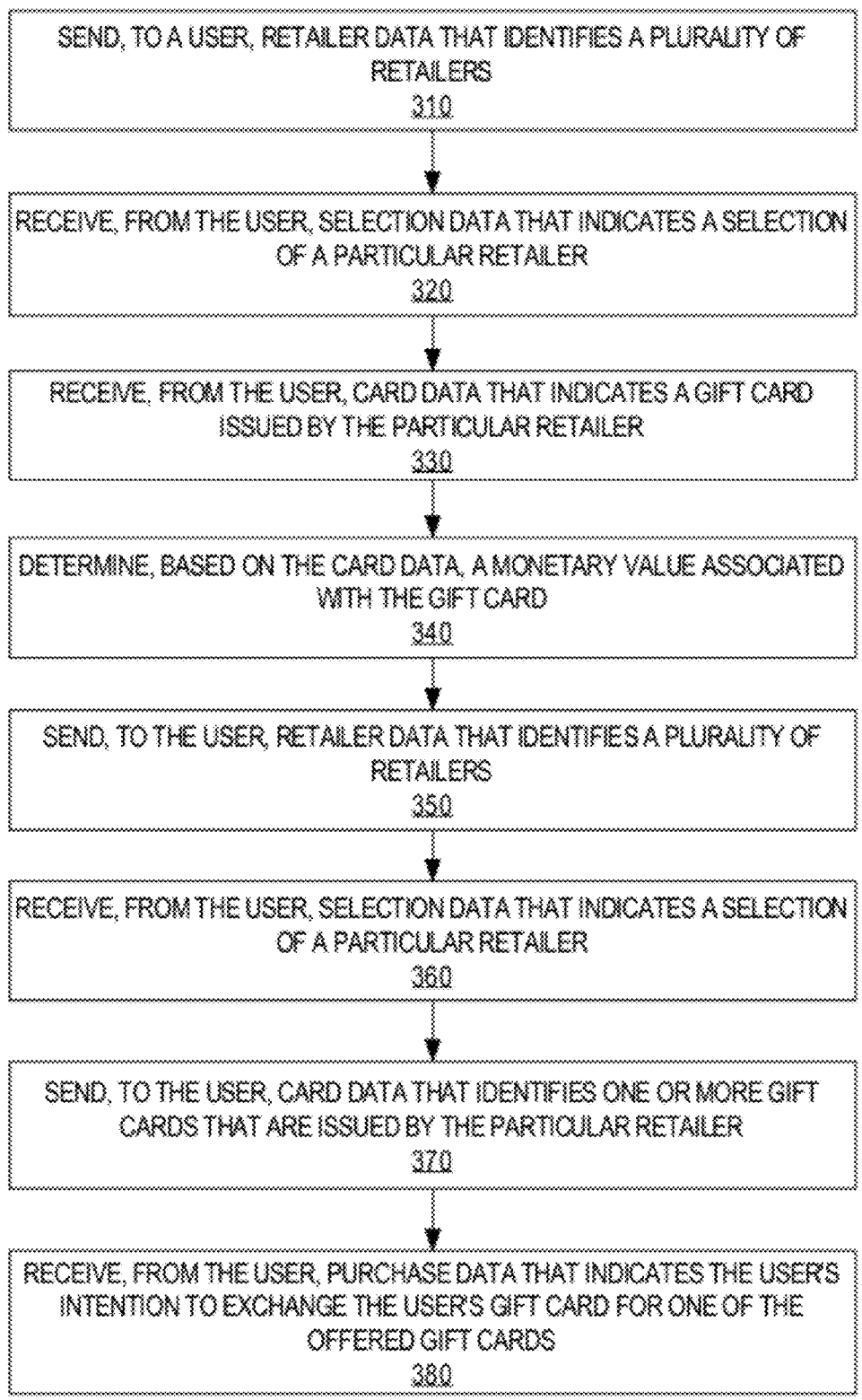
FIG. 3 is a flow diagram that depicts a process for exchanging one closed-loop instrument for another, according to an embodiment of the invention.

FIG. 3 is a flow diagram that depicts a process for exchanging one closed-loop stored-value instrument (or gift card) for another, according to an embodiment of the invention. The steps of process 300 are performed from the perspective of a gift card exchange service, such as gift card 130, that is "outside of the loop" with respect to both the exchanged gift card and the exchanged-for gift card.

At step 310, a gift card exchange service sends, to the user, first retailer data that identifies a first plurality of retailers. As used hereinafter, "sending data to a user" is shorthand for sending data to a device that is operated by the user. Similarly, "receiving data from a user" is shorthand for receiving data from a device that is operated by the user.

At step 320, the gift card exchange service receives, from the user, selection data that indicates a selection of a first retailer from the first plurality of retailers.

At step 330, the gift card exchange service receives, from the user, card data that indicates a gift card that is issued by the first retailer. This card data may include a number and a PIN associated with the gift card.

In an alternative embodiment, steps 310 and 320 are optional and the process begins at step 330.

At step 340, the gift card exchange service determines, based on the card data, a monetary value associated with the gift card.

At step 350, the gift card exchange service sends, to the user, second retailer data that identifies a second plurality of retailers from which the user may select. The second plurality of retailers may be the same as or different than the first plurality of retailers.

At step 360, the gift card exchange service receives, from the user, selection data that indicates a selection of a second retailer of the second plurality of retailers. The second retailer is different than the first retailer. This selection indicates the user's intent to exchange his/her gift card for a gift card issued by the second retailer.

At step 370, in response to this selection, the gift card exchange service sends, to the user, card data that identifies one or more gift cards that are issued by the second retailer.

At step 380, the gift card exchange service receives, from the user, purchase data that indicates the user's intention to exchange the user's gift card for one of the offered gift cards in step 370.

Alternatively, step 350 may comprise the gift card exchange service sending, to the user, exchange data that identifies a plurality of gift cards from which the user may select. The plurality of gift cards may be issued by a plurality of different retailers. In this alternative embodiment, the gift card exchange service receives (in place of steps 360 and 370), from the user, selection data that indicates a selection of a particular gift card from among the plurality of gift cards.

Gift Card Exchange Example

For example, the gift card exchange service hosts a web server that provides web pages in response to HTTP requests from client devices. A card holder operates a network device and causes the network device to request a web page from the gift card exchange service's web server. The web page includes a mechanism, (e.g., a drop down menu) to allow the card holder to select, from among a first plurality of retailers, the party that issued the card holder's gift card. Additionally or alternatively, the web page includes one or more fields into which the holder may enter the gift card number and PIN. The same (or subsequent web page, depending on the implementation) provides a mechanism to allow the user to select, from among a second plurality of retailers (e.g., via another drop down menu), a second party that issues gift cards. One of the gift cards owned by the gift card exchange service and issued by the second party will be presented to the card holder for selection.

In either scenario, the gift card exchange service determines a gift card from another retailer (i.e., one "outside of the loop" with respect to the card holder's gift card) to provide to the card holder by sending the gift card data to the card holder's network device. The gift card exchange service may determine the gift card based on input from the card holder's network device or automatically based on other factors. For example, the card holder may select one or more gift cards for which the card holder may desire to exchange his/her gift card. Alternatively, the gift card exchange service may determine one or more gift cards to provide, to the card holder, as options for exchange based on the balance of the card holder's gift card, the availability and balance of other gift cards owned by the gift card exchange service, and/or a profile of the card holder. For example, based on previous business interactions with the card holder, the gift card exchange service accesses data that identifies which gift cards (including the retailers and balances of the gift cards) the card holder has purchased from the gift card exchange service in the past. If the card holder has purchased, from the gift card exchange service, a number of $100 CompanyY gift cards, then it is likely that, with a $100 CompanyX gift card, the holder may wish to exchange his/her gift card for a $100 (or similar amount) CompanyY gift card.

Similar to embodiments described above, the gift card exchange service may make an offer for a card holder's gift card where the value of the sought-for gift card is less than, the same as, or more than the balance on the card holder's gift card. For example, the gift card exchange service might offer a $90 CompanyY gift card for a $100 CompanyX gift card. As another example, the gift card exchange service might offer a $100 CompanyY gift card for a $100 CompanyX gift card. As yet another example, as part of a promotion by CompanyY or the gift card exchange service, the gift card exchange service might offer a $110 CompanyY gift card for a $100 CompanyX gift card.

Gift Card "Redemption"

In some situations, a card holder might want to receive cash (or other currency) for his/her gift card from a party that is different than the party that issued the gift card, i.e., without the card holder purchasing any items from the issuing party. In this way, although balance remains on the gift card, the gift card is "redeemed" from the perspective of the card holder. A card holder may present his/her gift card for "redemption" in a POS (point of sale) environment or an online environment. For example, in a POS environment, a card holder may present her gift card in a pawn shop, at a kiosk or ATM, or in a merchant's store, each of which is "outside of the loop" with respect to the issuer of the gift card). In an online environment, a card holder may enter, via a web browser or another software application, information that uniquely identifies his/her gift card and cause that gift card information to be sent, over a network, to an entity that is "outside of the loop" with respect to the issuer of the gift card. In both environments, the entity that receives the gift card information from the card holder determines the validity and balance of the gift card or contracts with another entity that makes the determination.

Figure 4:
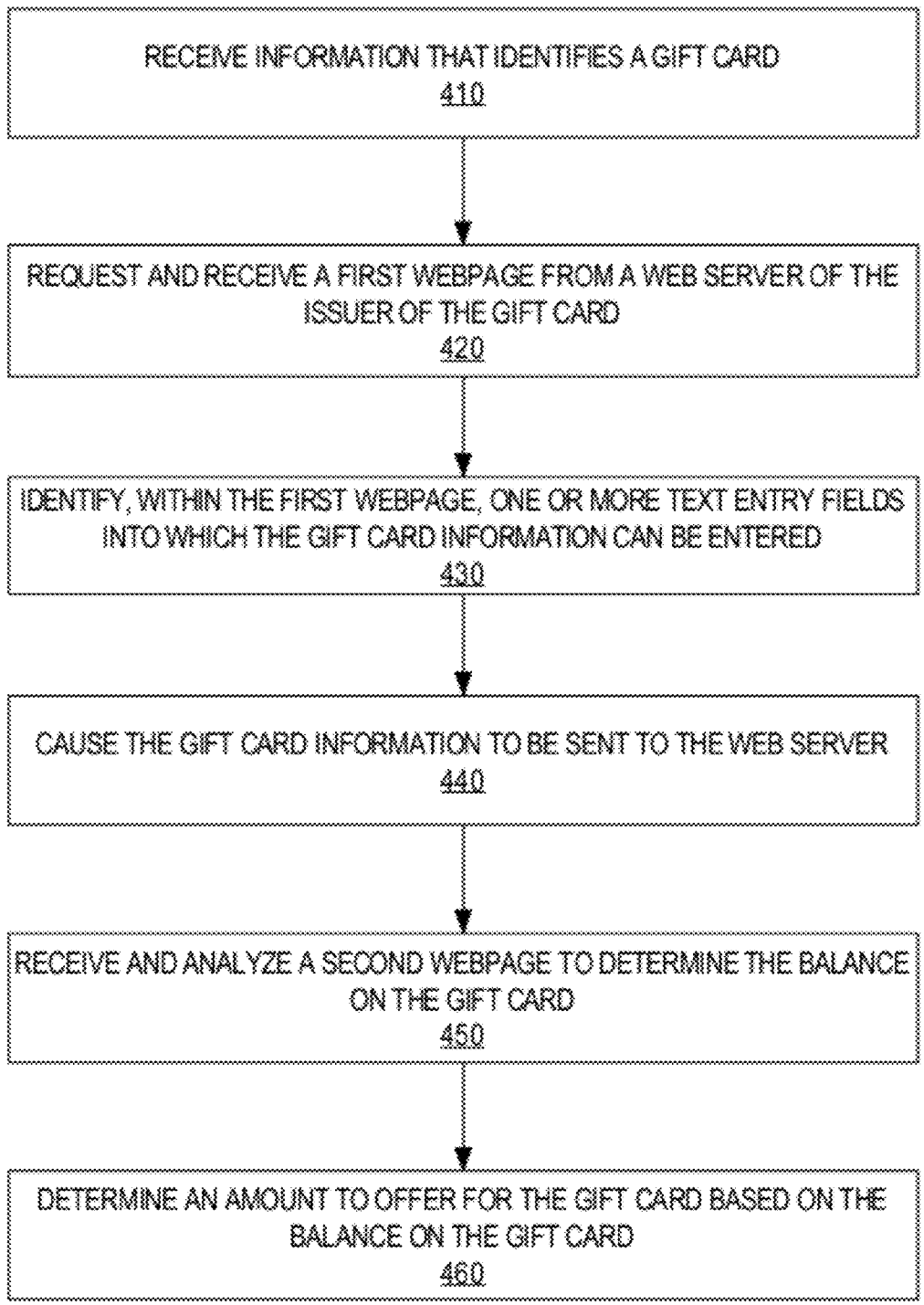
FIG. 4 is a flow diagram that depicts a process for determining the balance of a gift card, according to an embodiment of the invention.

The entity that determines the validity and balance of the gift card may do so through means that are available to any card holder through a web interface, similar to the process referred to as "Web data harvesting," described above under the subheading "ALTERNATE BALANCE OFFER." FIG. 4 is a flow diagram that depicts an example process 400 for determining the balance of a gift card, where the process relies on Web data harvesting, according to an embodiment of the invention. Although described as being performed by a single entity (such as a gift card exchange service), the steps of process 400 may be performed by multiple entities that are associated with each other. For example, a gift card exchange service might rely on another process or service to determine the balance on a gift card.

In step 410, a gift card exchange service receives information that uniquely identifies a gift card and that is sufficient to determine the balance on the gift card. The gift card exchange service may receive this information (a) from the card holder through a web interface (e.g., a web browser of the card holder sending data to a web server of the gift card exchange service) provided by the gift card exchange service or (b) from another party, such as a pawn shop, an ATM, or kiosk to which the card holder presented his/her gift card.

Figure 5A:
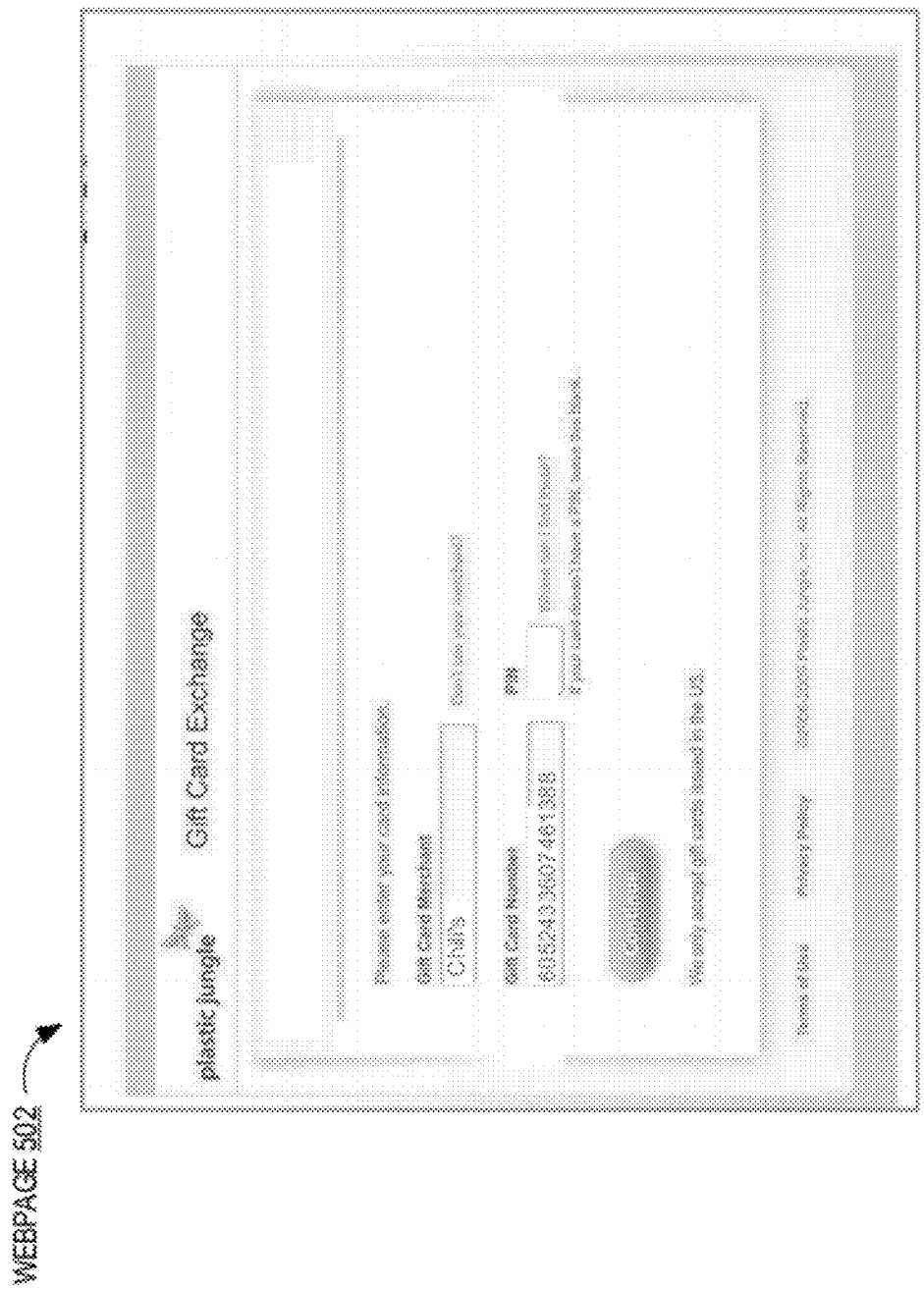
FIGS. 5A-D are diagrams that depict webpages that are generated during the process of a card holder receiving an offer for a gift card, according to an embodiment of the invention.

FIG. 5A depicts a webpage 502 generated by the gift card exchange service and displayed at a client device, according to an embodiment of the invention. Webpage 502 includes a text entry field for identifying the issuer of the gift card, a text entry field for the gift card number, and a text entry field for a PIN, if any. In this embodiment, the gift card exchange service receives the gift card information in response to user selection of the "Continue" button.

Figure 5B:
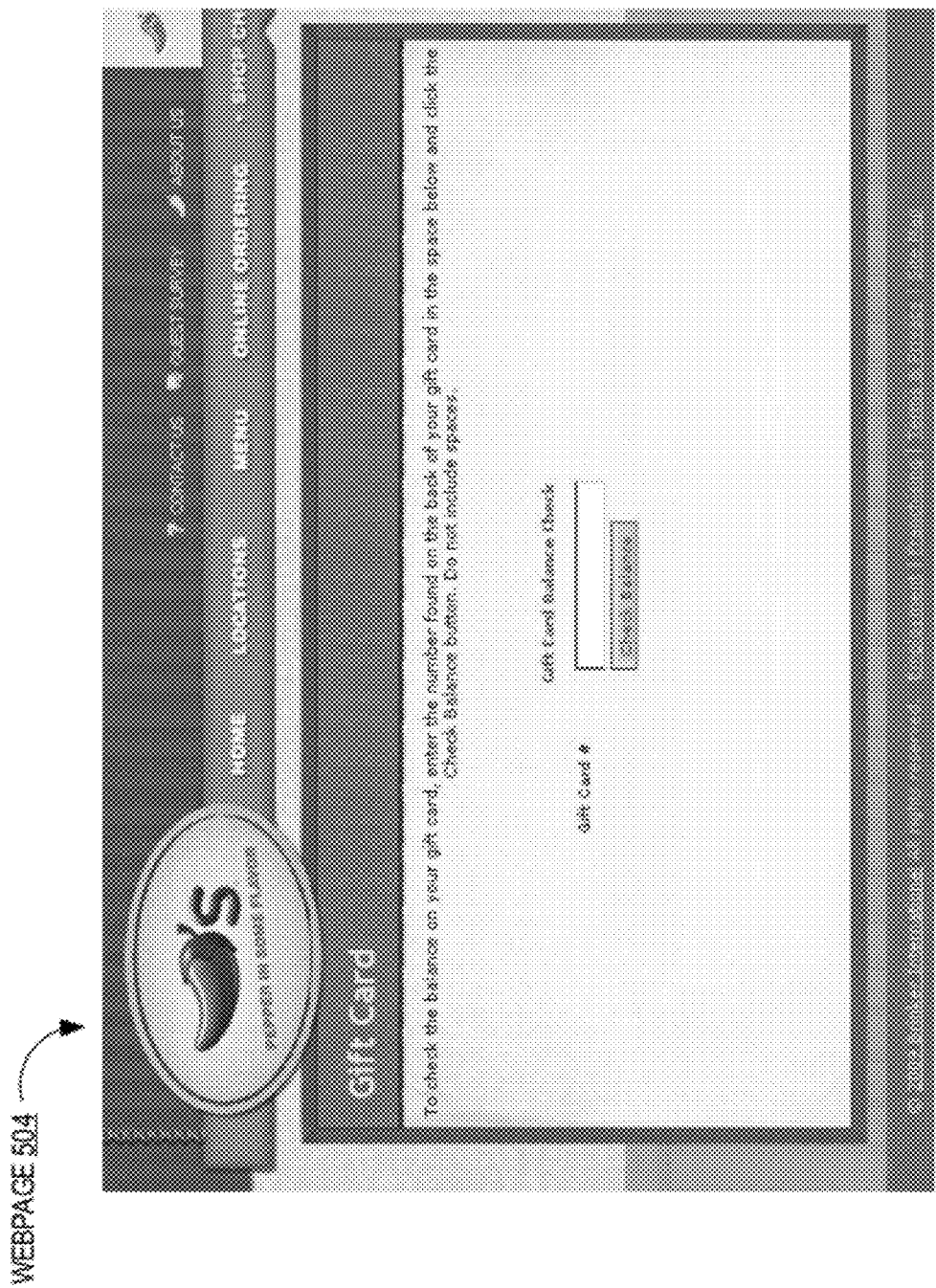

In step 420, in response to receiving the information, a balance inquiry bot controlled by the gift card exchange service requests and receives a first webpage from a web server of the issuer of the gift card. FIG. 5B depicts a webpage 504 generated by the issuer of the gift card, which issuer is Chili's™ in this example. Webpage 504 is an example of this "balance inquiry webpage" referred to in step 420.

In step 430, the balance inquiry bot analyzes the first webpage to identify, within the first webpage, one or more text entry fields into which the gift card information is to be entered. One text entry field might be for a card number while another text entry field might be for a gift card's PIN. The balance inquiry bot enters the gift card information in the appropriate one or more text entry fields of the webpage. In FIG. 5B, webpage 504 includes a text entry field for the gift card number.

In step 440, the gift card exchange service selects a button or other submission means in the webpage to cause the gift card information to be sent to the web server of the issuer of the gift card. In FIG. 5B, webpage 504 includes a "Check Balance" button.

In step 450, the gift card exchange service receives a second webpage from the web server and analyzes the second webpage to determine whether the gift card is valid and what the current balance is on the gift card.

Figure 5C:
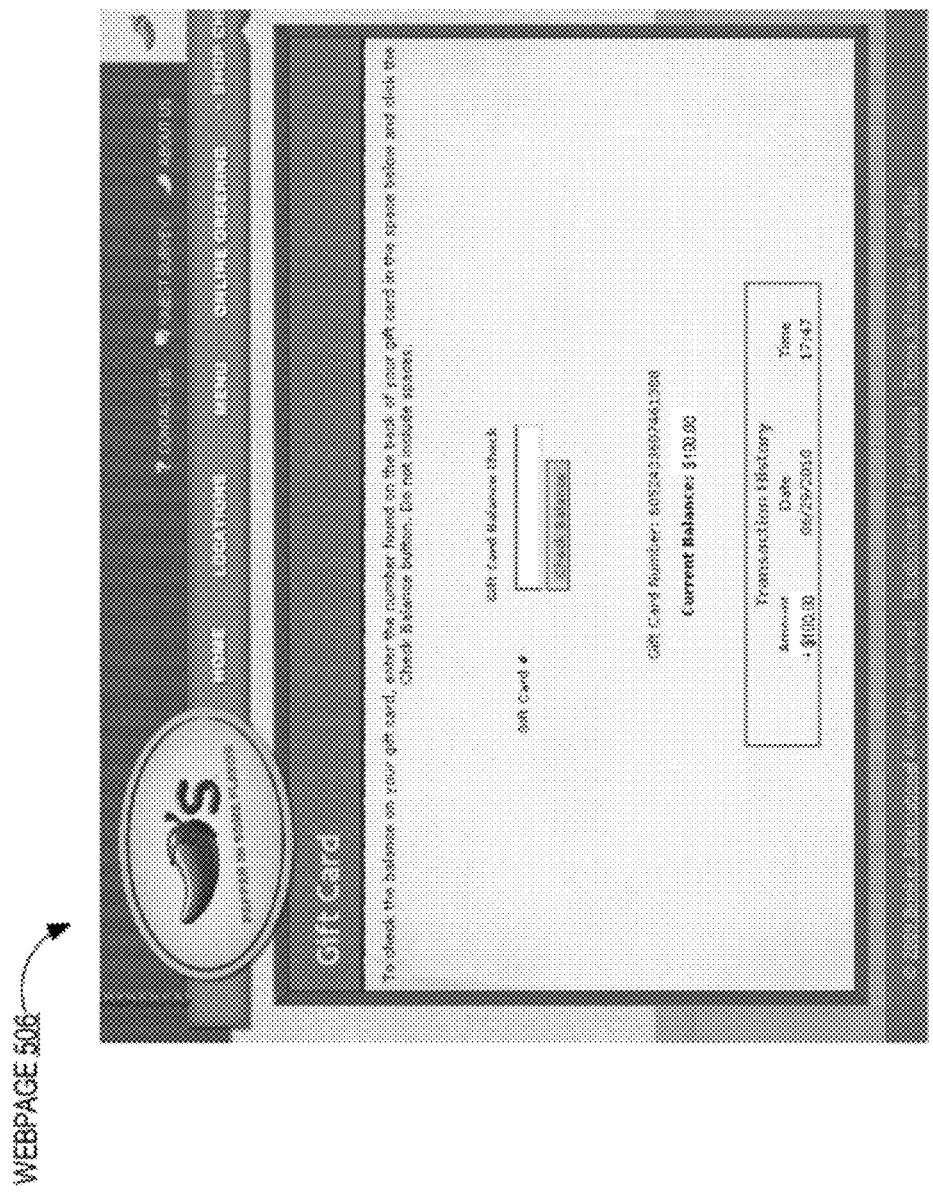

FIG. 5C depicts a webpage 506 generated by a web server operated by Chili's™. Webpage 506 indicates that the current balance of the gift card (identified by the gift card number entered in webpage 502 of FIG. 5A) is $100. Because a current balance is indicated, the gift card is valid.

Steps 420-450 may be performed by another entity with which the gift card exchange service contracts to perform the retrieval of the balance of the gift card through publicly available means. "Publicly available means" indicates that no username or password is required to obtain balance information about the gift card. As FIGS. 5B and 5C illustrate, "publicly available means" might include a website that is accessible by a web browser executing on a client device.

Figure 5D:
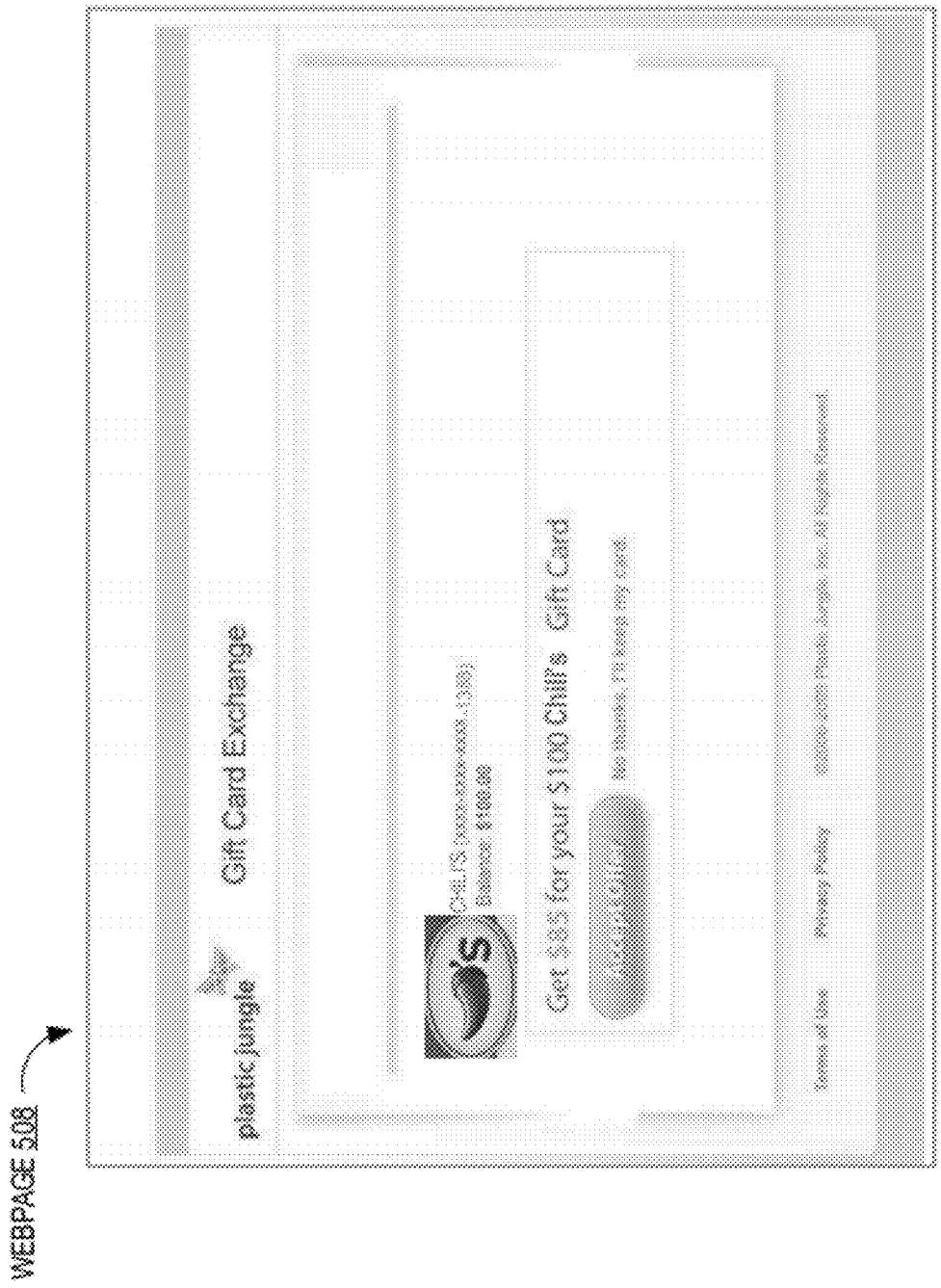

In step 460, if the gift card is determined to be valid and has a positive balance, then gift card exchange service determines an amount to offer the card holder (or other party that accepted the gift card). For example, FIG. 5D depicts a webpage 508 that indicates that the gift card exchange service offers the card holder $85 for the $100 Chili's™ gift card.

As another example, if the balance on the gift card is $100 and the card holder presents his/her card to a pawn shop attendant, then the attendant might swipe the gift card through a card reader that sends the gift card data to the gift card exchange service, which might offer the pawn shop $85 for the gift card. The pawn shop attendant, in turn, might offer a lower amount for the gift card, such as $50. In a related example, a kiosk or ATM may be in the role of the pawn shop in reading the gift card data, receiving an offer from the gift card exchange service, and providing, to the card holder, its own offer for the gift card.

In the above examples, a card holder effectively trades in his/her gift card for dollars (or other cash currency, such as the Euro). However, embodiments of the invention are not so limited. For example, a card holder might trade in his gift card for airline miles, virtual currency, or practically any other item (virtual or not) that the card holder values (or vice versa, e.g., airline miles for merchant currency) and that the gift card acceptor (e.g., outside-the-loop merchant, pawn shop, ATM, kiosk, etc.) can provide.

Captcha

Some gift card issuers, through their publicly available websites, employ CAPTCHA when accepting gift card information in order to verify that the issuers are dealing with people instead of an automated program. CAPTCHA is a type of challenge-response test used in computing to ensure that the response is not generated by a computer. The test usually involves an automated process asking a user to complete a simple test which the automated process is able to generate and grade. Because other automated processes are unable to solve the CAPTCHA, any user entering a correct solution is presumed to be human. The CAPTCHA challenge may involve an image, video, or audio, or any combination thereof. A common type of CAPTCHA requires that the user type letters or digits from a distorted image that appears on the screen. If the user enters the correct letters and/or digits, then the user is provided the information that the user requested.

Therefore, for those card issuers that use CAPTCHA, the balance inquiry bot copies the CAPTCHA challenge from a webpage generated by a web server of the card issuer. The gift card exchange service then causes the CAPTCHA challenge to be presented to the user, e.g., via a webpage. In the above example comprising FIGS. 5A-5D, the CAPTCHA challenge would be displayed to the user after the gift card exchange service receives webpage 504 and before submission of the gift card number to the web server of the issuer. Subsequently, the gift card exchange service receives the CAPTCHA response (whether text or audio) from the user and causes the response to be sent to the card issuer's website along with the gift card information received from (e.g., entered by) the card holder.

Offering a Discount for a Purchase Absent a Gift Card from the Purchaser

Over time, a gift card exchange service might come into the possession of hundreds or even thousands of gift cards, each of which has a significant balance. "Possession" of a gift card may include (a) actual possession of the physical gift card or (b) electronic storage of information that identifies the gift card, such as the gift card's number and any PIN, without actual possession of the physical gift card. In order to divulge itself of such a large inventory of gift cards, the gift card exchange service might use the gift cards without end users ever knowing about the gift cards while the end users are making purchases.

For example, a user visits the website of CompanyX, identifies three items to purchase, and continues to the checkout phase of the payment flow where the user is presented an option on how to pay for the three items, which totals $100. A browser plug-in, acting for the gift card exchange service and executing on the user's computing device, detects a specific condition. The condition may be that the user has navigated to the website of CompanyX, or that the user is about to make a payment to CompanyX. The browser plug-in identifies that CompanyX is the merchant and, in response, notifies the gift card exchange service, which, in turn, identifies a gift card (a) that CompanyX issued and (b) that the gift card exchange service currently possesses. The gift card has a current balance of $100. Previous to this transaction, the gift card exchange service purchased the gift card from another user for $90. The gift card exchange service then sends instructions to the browser plug-in to offer the user a 5% discount on the $100 purchase. If the user accepts, then the browser plug-in may direct the user to a webpage of the gift card exchange service, or cause a form to be displayed where the user can enter payment information, such as credit card or a debit card of the user. Thus, the user pays the gift card exchange service $95 and the gift card exchange service applies the $100 gift card to the purchase of the three items.

As another example, a user instructs a web browser to access a website of CompanyX. A browser plug-in of a gift card exchange service generates a message that is subsequently displayed to the user and that indicates that the user can receive immediate discounts up to $10 off. For example, a gift card exchange service may own (1) a $10 gift certificate from CompanyX that it purchased for $9, (2) a $50 gift certificate from CompanyX that it purchased for $45, and (3) a $100 gift card that it purchased for $90. In this case, the browser plug-in generates another message that indicates that the user can receive 50 cents off any purchase over $10, $2 off any purchase over $50, and $5 off any purchase over $100. In this example, the user intends to make a purchase of one or more items totaling $152. Under these circumstances, the gift card exchange service applies a $147 charge to the user's credit card. The gift card exchange service also pays for the purchase using the $100 gift card, the $50 gift certificate, and $2 cash. In this scenario, the user receives a $5 discount, and the gift card exchange service obtains $147 in exchange for $137 ($90+$45+$2).

Loading Value into a Preexisting Account

According to an embodiment of the invention, a gift card exchange service receives a gift card data from a card holder and, in exchange for the gift card, funds (or upload value to) a pre-existing account of the card holder. Non-limiting examples of a pre-existing account include a PayPal™ account, a Facebook™ credits account, or a wireless phone account. Thus, the value of the purchase by the gift card exchange service is used to increase the balance of an account of the card holder, whether the balance is in dollars or another currency, including virtual currency.

For example, a card holder sends, to a gift card exchange service (e.g., through a web interface), information that identifies a gift card of the card holder. The gift card was issued by CompanyX and has a current balance of $100. The gift card exchange service, in exchange for the gift card, offers to pay $90 to the card holder's utilities account, which will be applied by the card holder's utility company to pay for a pending water bill of the card holder.

E-Codes

According to an embodiment of the invention, a gift card exchange service offers an "e-code" to a card holder in exchange for the card holder's gift card. An "e-code" is a value that a gift card exchange service associates with (a) information that identifies the gift card or (b) information that identifies the transaction (i.e., the exchange of the gift card for an e-code). An e-code may comprise letters, numbers, or any combination thereof. An e-code may be a unique value relative to all the e-codes generated by a gift card exchange service. The card holder (who no longer owns the gift card) can then use the e-code when purchasing an item from a certain party, whether or not the certain party is same as or different than the party that issued the gift card.

Additionally, a user may decide to buy a gift card issued by a specific merchant from a website operated by the gift card exchange service. On payment, the gift card exchange service delivers only an e-code to the user.

For example, a user sends, to a gift card exchange service (e.g., through a web interface or via cell phone), information that identifies a gift card of the card holder. The gift card was issued by CompanyX and has a current balance of $100. The gift card exchange service, in exchange for the gift card, offers to pay $90 to the user. Rather than sending any form of payment to the user, the gift card exchange service generates an e-code (or retrieves an e-code from a list of pre-generated e-codes) and associates the e-code with this transaction or with information that identifies the gift card number. This e-code may be the card number of the gift card sold to the gift card exchange service, or it may be a separate code that represents the card value. The gift card exchange service sends (e.g., via email or cell phone) the e-code to the user. The user then accesses (e.g., via a web browser) the website of CompanyY, identifies one or more items to purchase from CompanyY, and proceeds to a checkout webpage. At the checkout webpage, the user enters the e-code into his/her browser window and submits the e-code as payment for the one or more items. The gift card exchange service applies some or all of the $90 (i.e., that the gift card exchange service offered to the user) to the purchase of the one or more items sold by CompanyY.

Hardware Overview

Figure 6:
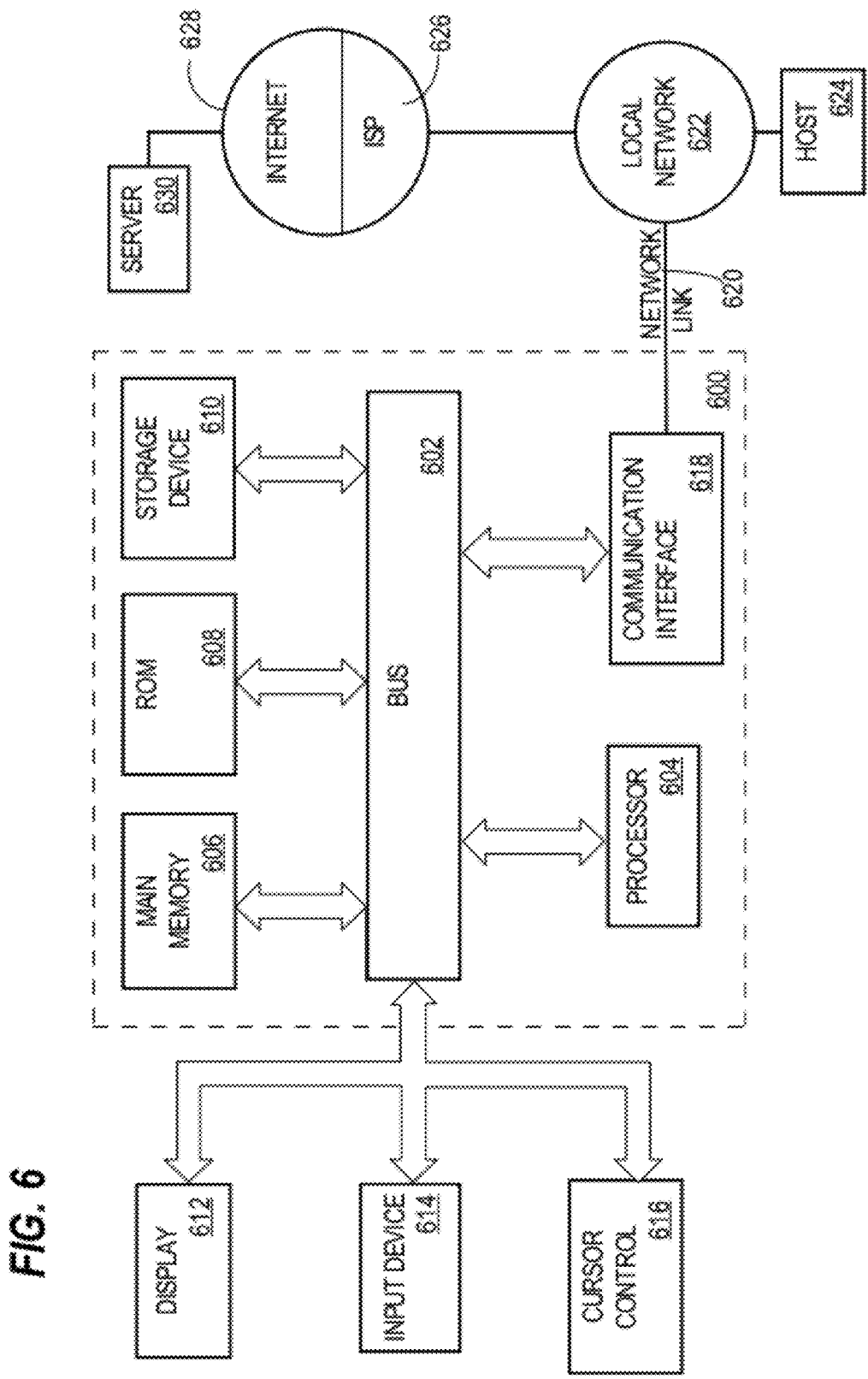
FIG. 6 is a block diagram that depicts a computer system upon which an embodiment of the invention may be implemented.

FIG. 6 is a block diagram that depicts a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method performed by one or more computing devices of a first party, comprising the computer-implemented steps of:

while owning, by the first party, a closed-loop stored-value instrument that has a positive current balance that has been issued by a particular merchant, wherein the particular merchant is different than the first party:

receiving at the one or more computing devices of the first party purchase data that indicates a particular amount that must be paid in order to purchase one or more items from the particular merchant;

providing by the one or more computing devices of the first party an offer message to be displayed to a user that initiated the purchase of the one or more items from the particular merchant, wherein the offer message includes an offer that indicates that the particular amount can be reduced if the user accepts the offer, wherein the offer is based on at least the positive current balance of the closed-loop stored-value instrument owned by the first party;

receiving at the one or more computing devices of the first party input that indicates that the user accepted the offer;

in response to receiving the input, providing by the one or more computing devices of the first party to the particular merchant an identifier of the closed-loop stored-value instrument as value for a first portion of the particular amount, wherein the first portion is based on the current balance of the closed-loop stored-value instrument; and receiving payment at the one or more computing devices of the first party from the user in exchange for the first party providing the particular merchant the identifier of the closed-loop stored-value; and wherein the first party provides a gift card exchange service.

2. The method of claim 1, wherein the offer message is presented to the user via a plug-in to a web browser.

3. The method of claim 1, further comprising, prior to the step of receiving the purchasing data:

determining that a webpage is from the particular merchant and is being displayed to the user;

wherein the step of providing the offer message is performed in response to determining that the webpage that is from the particular merchant is being displayed to the user.

4. The method of claim 1, further comprising:

identifying a plurality of closed-loop stored-value instruments, each of the plurality of closed-loop stored-value instruments having a current balance that is positive; and applying the current balances of each closed-loop stored-value instrument of the plurality of closed-loop stored-value instruments to the particular amount.

5. The method of claim 1, comprising causing cash to be applied to the particular amount.

6. The method of claim 1, wherein:

the current balance of the closed-loop stored-value instrument is a first amount;

the closed-loop stored-value instrument was purchased by a first party for a second amount that is less than the first amount; and the payment is for a third amount that is greater than the second amount and less than the first amount.

7. One or more non-transitory machine-readable media storing instructions which, when executed by one or more processors, cause the performance of the method comprising:

a first party, while owning or representing an owner of, a closed-loop stored-value instrument that has a positive current balance issued by a particular merchant, wherein the particular merchant is different than the first party:

receiving at one or more computing devices of the first party purchase data that indicates a particular amount that must be paid in order to purchase one or more items from the particular merchant;

providing by the one or more computing devices of the first party an offer message to be displayed to a user that initiated the purchase of the one or more items from the particular merchant, wherein the offer message includes an offer that indicates that the particular amount can be reduced if the user accepts the offer, wherein the offer is based on the positive current balance of the closed-loop stored-value instrument owned by the first party;

receiving at the one or more computing devices of the first party input that indicates that the user accepted the offer;

in response to receiving the input, providing by the first party to by the one or more computing devices the particular merchant an identifier of the closed-loop stored-value instrument as value for a first portion of the particular amount, wherein the first portion is based on the current balance of the closed-loop stored-value instrument; and receiving payment at the one or more computing devices of the first party from the user in exchange for the first party providing the particular merchant the identifier of the closed-loop stored:

wherein the first party provides a gift card exchange service.

8. The one or more non-transitory machine-readable media of claim 7, further comprising storing instructions which, when executed by one or more processors, present the offer message to the user via plug-in to a web browser.

9. The one or more non-transitory machine-readable media of claim 7, further comprising storing instructions which, when executed by one or more processors, prior to the receiving the purchase data:

determine that a webpage that is from the particular merchant and is being displayed to the user; and wherein providing the offer message is performed in response to determining that the webpage that is from the particular merchant is being displayed to the user.

10. The one or more non-transitory machine-readable media of claim 7, further comprising storing instructions which, when executed by one or more processors:

identify a plurality of closed-loop stored-value instruments, each of which having a current balance that is positive; and apply the current balances of each closed-loop stored-value instrument of the plurality of closed-loop stored-value instruments to the particular amount.

11. The one or more non-transitory machine-readable media of claim 7, further comprising storing instructions which, when executed by one or more processors, cause cash to be applied to the particular amount.

12. The one or more non-transitory machine-readable media of claim 7, wherein:

the current balance of the closed-loop stored-value instrument is a first amount;

the closed-loop stored-value instrument was purchased by a first party for a second amount that is less than the first amount; and the payment is for a third amount that is greater than the second amount and less than the first amount.

* * * * *